(12) United States Patent
Bertini et al.

(10) Patent No.: US 7,195,504 B2
(45) Date of Patent: Mar. 27, 2007

(54) HIGH-PRESSURE POWER CABLE CONNECTOR

(75) Inventors: Glen John Bertini, Tacoma, WA (US); Anthony Roy Theimer, Auburn, WA (US)

(73) Assignee: Novinium, Inc., Coupeville, WA (US)

( * ) Notice: Subject to any disclaimer, the term of this patent is extended or adjusted under 35 U.S.C. 154(b) by 0 days.

(21) Appl. No.: 11/070,393

(22) Filed: Mar. 1, 2005

(65) Prior Publication Data

US 2005/0191910 A1    Sep. 1, 2005

Related U.S. Application Data

(60) Provisional application No. 60/549,262, filed on Mar. 1, 2004, provisional application No. 60/549,322, filed on Mar. 1, 2004.

(51) Int. Cl.
*H01R 4/64* (2006.01)
(52) U.S. Cl. .................................. 439/201; 439/676
(58) Field of Classification Search ................ 439/200, 439/921, 132, 158, 190, 194, 199, 201, 204, 439/271, 587, 206
See application file for complete search history.

(56) References Cited

U.S. PATENT DOCUMENTS

| | | | |
|---|---|---|---|
| 2,080,271 A | 5/1937 | Hirst et al. |
| 2,247,671 A | 7/1941 | Tepel |
| 2,938,940 A | 5/1960 | Calendine et al. |
| 2,958,844 A | 11/1960 | Smith et al. |
| 3,036,147 A | 5/1962 | Wheaton et al. |
| 3,141,060 A | 7/1964 | Norton |
| 3,242,255 A | 3/1966 | Falkenstein et al. |
| 3,457,359 A | 7/1969 | Soucy |
| 3,717,717 A | 2/1973 | Cunningham et al. |
| 3,810,078 A | 5/1974 | Chordas |
| 3,816,641 A | 6/1974 | Iversen |

(Continued)

FOREIGN PATENT DOCUMENTS

DE    314904    6/1983

(Continued)

OTHER PUBLICATIONS

Primedia Business Magazines & Media Inc.; Transmission & Distribution World; "Submarine Cable Rescued With Silicone-Based Fluid"; Jul. 1, 1999; 4 pgs.; USA.

(Continued)

*Primary Examiner*—James R. Harvey
(74) *Attorney, Agent, or Firm*—George C. Rondeau, Jr.; Davis Wright Tremaine LLP

(57) ABSTRACT

A high-pressure connector for an electrical power cable segment having a central stranded conductor encased in a polymeric insulation jacket with an interstitial void volume in the region of the conductor. The connector confines a fluid within the interstitial void volume at a residual pressure above atmospheric, but below the elastic limit of the insulation jacket. A housing interior chamber receives the conductor in fluid communication with the interstitial void volume. Some embodiments have the chamber sized to receive and overlap a portion of the insulation jacket with a housing end portion swaged thereto. A seal seals the insulation jacket with respect to the housing and a retaining member secures the cable segment to the housing to prevent pushback of the insulation jacket at the residual pressure.

39 Claims, 17 Drawing Sheets

U.S. PATENT DOCUMENTS

| | | |
|---|---|---|
| 3,823,254 A | 7/1974 | Smith |
| 3,845,450 A * | 10/1974 | Cole et al. ............... 439/141 |
| 3,846,578 A | 11/1974 | Bahder et al. |
| 3,848,451 A | 11/1974 | Allen |
| 3,883,208 A | 5/1975 | Sankey et al. |
| 3,939,882 A | 2/1976 | Gillemot |
| 3,945,700 A | 3/1976 | Didier |
| 3,961,127 A | 6/1976 | Gear, Jr. et al. |
| 3,992,569 A * | 11/1976 | Hankins et al. ............ 174/92 |
| 4,144,404 A | 3/1979 | De Groef et al. |
| 4,174,145 A | 11/1979 | Oeschger et al. |
| 4,345,783 A | 8/1982 | Bergstrand |
| 4,372,988 A | 2/1983 | Bahder |
| 4,375,577 A | 3/1983 | Silver et al. |
| 4,403,110 A | 9/1983 | Morrisette |
| 4,450,318 A | 5/1984 | Scardina et al. |
| 4,477,376 A | 10/1984 | Gold |
| 4,479,690 A | 10/1984 | Inouye et al. |
| 4,484,022 A | 11/1984 | Eilentropp |
| 4,503,283 A | 3/1985 | Hancock et al. |
| 4,515,426 A | 5/1985 | Bager |
| 4,545,133 A | 10/1985 | Fryszczyn et al. |
| 4,621,168 A | 11/1986 | Bryant et al. |
| 4,642,415 A | 2/1987 | Lanfranconi et al. |
| 4,723,230 A | 2/1988 | Chelminski |
| 4,764,232 A | 8/1988 | Hunter |
| 4,766,011 A | 8/1988 | Vincent et al. |
| 4,831,214 A | 5/1989 | Wilck |
| 4,845,309 A | 7/1989 | Vincent et al. |
| 4,888,886 A | 12/1989 | Eager, Jr. et al. |
| 4,943,685 A | 7/1990 | Reynart |
| 4,945,653 A | 8/1990 | Eager, Jr. et al. |
| 4,946,393 A | 8/1990 | Borgstrom et al. |
| 4,959,022 A | 9/1990 | Neuroth |
| 4,961,961 A | 10/1990 | Vincent et al. |
| 4,978,694 A | 12/1990 | Vincent et al. |
| 5,006,286 A | 4/1991 | Dery et al. |
| 5,069,058 A | 12/1991 | Hyatt |
| 5,082,449 A | 1/1992 | Borgstrom et al. |
| 5,132,495 A | 7/1992 | Ewing et al. |
| 5,231,249 A | 7/1993 | Kimura et al. |
| 5,245,133 A | 9/1993 | DeCarlo et al. |
| 5,372,840 A | 12/1994 | Kleyer et al. |
| 5,372,841 A | 12/1994 | Kleyer et al. |
| 5,408,047 A | 4/1995 | Wentzel |
| 5,796,045 A | 8/1998 | Lancien et al. |
| 5,804,767 A | 9/1998 | Winfield et al. |
| 5,907,128 A | 5/1999 | Lanan et al. |
| 6,332,785 B1 | 12/2001 | Muench et al. |
| 6,338,637 B1 | 1/2002 | Muench, Jr. et al. |
| 6,489,554 B1 | 12/2002 | Bertini et al. |
| 6,517,366 B2 | 2/2003 | Bertini et al. |
| 6,916,193 B2 | 7/2005 | Varreng et al. |
| 2002/0046865 A1 | 4/2002 | Bertini et al. |

FOREIGN PATENT DOCUMENTS

| | | |
|---|---|---|
| DE | 3149048 | 6/1983 |
| GB | 870165 | 6/1961 |
| GB | 2037498 | 7/1980 |

OTHER PUBLICATIONS

Glen J. Bertini; "Entergy Metro Case Study: Post-Treatment Lessons", ICC meeting; Apr. 1997; Scottsdale, Arizona; USA.

Glen J. Bertini et al.; "Silicone Strand-Fill: A New Material and Process"; Insulated Conductors Committee (ICC) meeting; Spring 1990; 11 pgs.; Dearborn, Michigan; USA.

* cited by examiner

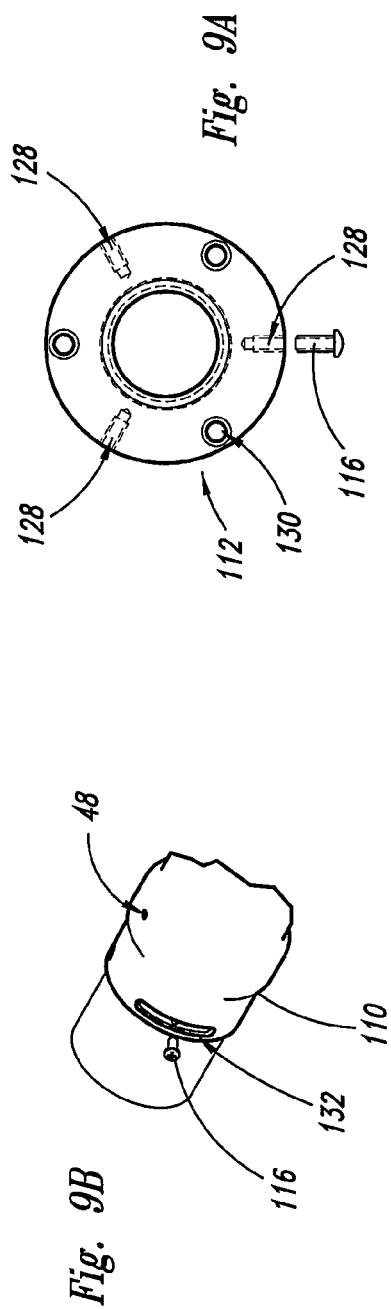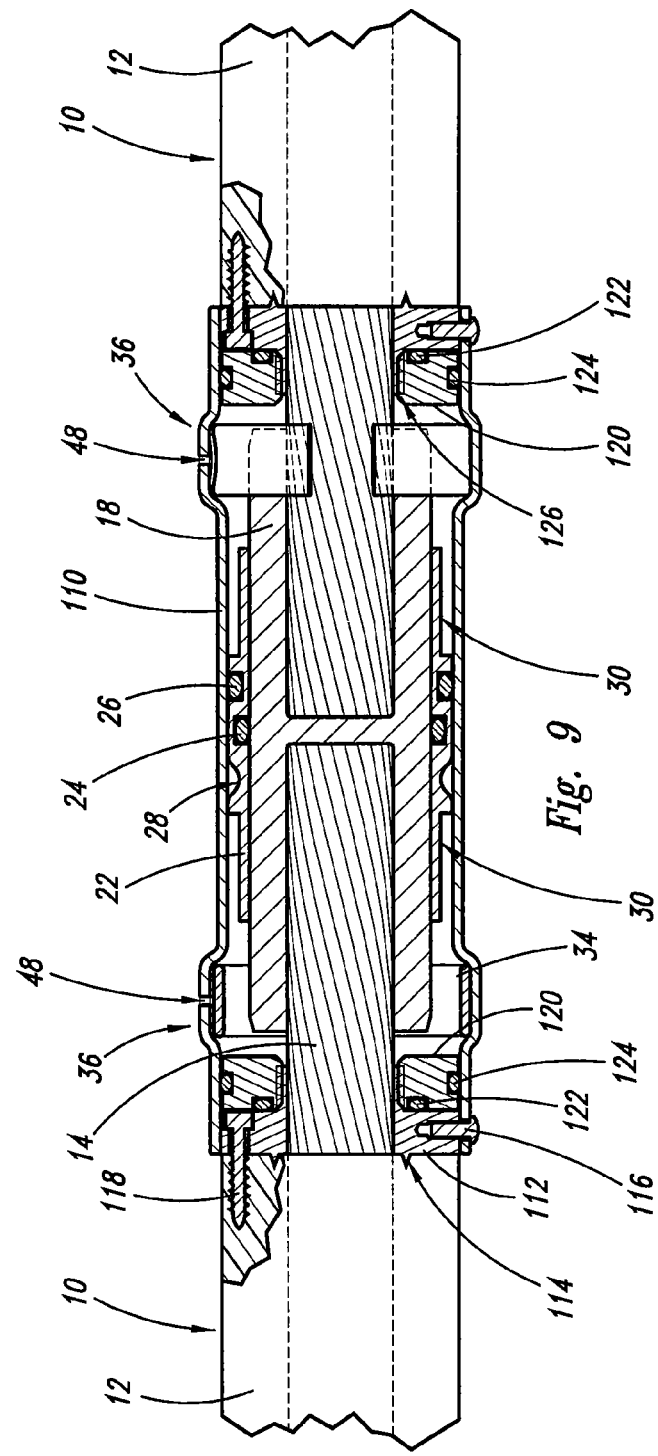

HIGH-PRESSURE POWER CABLE CONNECTOR

BACKGROUND OF THE INVENTION

1. Field of the Invention

The present invention relates to a connector suitable for injecting a dielectric enhancement fluid into the interstitial void volume of an electrical cable segment. More particularly, the invention relates to a high-pressure terminal connector and a high-pressure splice connector adapted for injecting the fluid at an elevated pressure and then confining the fluid within the void volume at a residual pressure, wherein pushback of the insulation jacket of the cable is essentially eliminated.

2. Description of the Related Art

Extensive networks of underground electrical cables are in place in many parts of the industrialized world. Such underground distribution offers great advantage over conventional overhead lines in that it is not subject to wind, ice or lightning damage. It is therefore viewed as a reliable means for delivering electrical power without obstructing the surrounding landscape, the latter feature being particularly appreciated in suburban and urban settings. Unfortunately, these cables, particularly those installed prior to 1985, which generally comprise a stranded conductor surrounded by a semi-conducting shield, a polymeric insulation jacket, and an insulation shield, often suffer premature breakdown and do not attain their originally anticipated longevity of 30 to 40 years. Their dielectric breakdown is generally attributed to so-called "treeing" phenomena (i.e., formation of microscopic voids or branching channels within the insulation material, from which the descriptive terminology derives), which lead to a progressive degradation of the cable's insulation. Since replacing a failed section of underground cable can be a very costly and involved procedure, there is a strong motivation on the part of the electrical utility industry to extend the useful life of existing underground cables in a cost-effective manner.

Many early efforts focused on rejuvenating in-service cables by either simply drying the insulation or introducing a tree retardant liquid into the void space (interstitial void volume) associated with the stranded conductor geometry after such a drying step (e.g., U.S. Pat. Nos. 4,545,133 and 4,372,988). The liquid was believed to diffuse out of the cable's interior and into the insulation, where it filled the microscopic trees and thereby augmented the service life of the cable.

An improvement over the above methods was proposed by Vincent et al. in U.S. Pat. No. 4,766,011, wherein the tree retardant liquid was selected from a particular class of aromatic alkoxysilanes which polymerized within the cable's interior as well as within the water tree voids in the insulation and therefore did not permeate rapidly out of the cable. This method and variations thereof employing certain rapidly diffusing components (see U.S. Pat. Nos. 5,372,840 and 5,372,841) have enjoyed commercial success over the last decade or so, but they still have some practical limitations when reclaiming underground residential distribution (URD) cables, which have a relatively small diameter, and therefore present insufficient interstitial volume relative to the amount of retardant required for optimum dielectric performance. Thus, although not explicitly required by the above mentioned disclosures, in-the-field reclamation of URD cables employing such silane-based compositions typically leaves a liquid reservoir connected to the cable for a 60 to 90 day "soak period" to allow additional retardant liquid to penetrate the cable insulation and thereby restore the dielectric properties. As a result, it is generally necessary to have a crew visit the site at least three times: first to begin the injection, which involves a vacuum at one end and a slightly pressurized feed reservoir on the other end; second to remove the vacuum bottle a few days later after the fluid has traversed the length of the cable; and finally to remove the reservoir after the soak period is complete. These repetitive trips are costly in terms of human resource. More importantly, each exposure of workers to energized equipment presents additional risk of serious injury or fatality and it would be beneficial to minimize such interactions. In view of the above limitations, a circuit owner might find it economically equivalent, or even advantageous, to completely replace a cable once it had deteriorated rather than avail himself of the above restorative methods.

In all of the above-recited methods for treating in-service cables, the tree retardant liquid is injected into the cable under a pressure sufficient to facilitate filling the interstitial void volume. And, although pressures as high as 400 psig have been employed to this end (e.g., *Transmission & Distribution World*, Jul. 1, 1999), the pressure is always discontinued after the cable is filled. At most, a residual pressure of up to about 30 psig is applied to a liquid reservoir after injection, as required for the soak period in the case of URD cable reclamation. Further, while higher pressures have been used to inject power cables, this prior use is solely to accelerate the cable segment filling time, especially for very long lengths as are encountered with submarine cables (e.g., the above *Transmission & Distribution World* article) or new cables injected with strand-blocking material (i.e., not a tree retardant or dielectric enhancing fluid) on-the-reel as contemplated by U.S. Pat. Nos. 4,845,309, 4,961,961, and 4,978,694.

Moreover, even when higher pressures were maintained in an experimental determination of possible detrimental effects of excessive pressure, a maximum pressure of 117 psig was maintained for only two hours. More to the point, in this experimental procedure the pressure was maintained for this brief period by an external pressure reservoir. (*Entergy Metro Case Study: Post-Treatment Lessons*, Glen Bertini, ICC April, 1997 Meeting, Scottsdale, Ariz.).

In the above methods, the liquid tree retardant was injected into the cable interior using special fittings comprising an injection port for the introduction of the tree retardant liquid and a means for sealing the device to the cable so that fluid would not leak out during injection. At relatively low injection pressures (e.g., less than about 30 psig), a small window could simply be cut into the cable insulation and a housing having an injection port clamped around this window with an appropriate seal interposed between the housing and insulation (see, for example, U.S. Pat. Nos. 3,939,882 and 4,545,133). Alternatively, again at relatively low pressures, various injection elbows and terminations having the required sealing means and injection port, and developed specifically for these purposes, could be employed (see, for example, U.S. Pat. Nos. 4,888,886; 4,945,653; 4,946,393; 6,332,785; 6,489,554 and 6,517,366).

At higher injection pressures (e.g., 30 to 2000 psig), a greater effort must be made to prevent the liquid from escaping. One connector employed a seal of the FasTest® type which comprises an elastomeric washer co-axially disposed over the insulation jacket and axially compressed between two similar metal washers within a surrounding housing so as to deform the elastomer and thereby form a seal between the insulation and the housing (e.g., see U.S. Pat. Nos. 2,080,271 and 4,345,783). This type of seal was used in the above-cited *Transmission & Distribution World* injection, wherein a setscrew on one of the metal washers was applied to the crimp connector during injection in order to prevent the connector from popping off the cable conductor due to the higher pressure and to make an electrical connection to the housing.

In some cable injection operations employing relatively high pressures (e.g., new cable injection with a strand blocking compound), Kellems grips (also known as "Chinese fingers"), applied either over the insulation jacket or over the unstripped cable, have been employed in combination with the above-mentioned FasTest® type connector, again to keep the latter from popping off the cable end. Optionally, hose clamps were applied over the Kellems grips to further secure the latter. However, both the injection adaptor and Kellems grips were always removed once injection was completed. (e.g., Bertini et al. *Silicone Strand-Fill: A New Material and Process*, Spring 1990 Insulated Conductors Committee (ICC) of the Power Engineering Society (PES) of the Institute of Electrical and Electronic Engineers (IEEE), Dearborn, Mich.)

BRIEF SUMMARY OF THE INVENTION

The high-pressure terminal or splice connectors contemplated in the instant application address the above mentioned problems and are designed to inject a dielectric-enhancing fluid (e.g., a tree retardant fluid) into the interstitial void volume of an electrical cable segment at a high pressure and confine the fluid therein at a similarly high, sustained residual pressure. Alternatively, the instant device can be a high-pressure splice connector used in a flow-though mode wherein injection of fluid takes place at a remote point of the cable segment. Furthermore, the instant high-pressure connectors allow residual fluid pressure to be maintained in the interstitial void volume of the cable while essentially eliminating pushback of the insulation jacket.

Embodiments of the invention include a high-pressure connector for an electrical power cable segment having a central stranded conductor encased in a polymeric insulation jacket and having an interstitial void volume in the region of the stranded conductor, the high-pressure connector being suited for confining a fluid within the interstitial void volume at a residual pressure above atmospheric or zero gauge pressure, but below the elastic limit of the polymeric insulation jacket. In at least one embodiment the high-pressure connector has a housing with a wall defining an interior chamber configured to be in fluid communication with the interstitial void volume. The housing has an end portion with the housing wall thereof sized to receive the insulation jacket within the interior chamber and to overlap at least a portion of the insulation jacket at an end thereof with the cable segment extending from the housing end portion and at least a portion of the stranded conductor positioned within the interior chamber. The housing wall of the housing end portion has an engagement portion configured to be sufficiently secured to the insulation jacket and in fluid-tight sealed engagement therewith to confine the fluid at the residual pressure within the housing interior chamber and the interstitial void volume and to prevent pushback of the insulation jacket at the residual pressure.

One aspect of the invention includes the engagement portion of the housing wall of the housing end portion having inwardly projecting engagement members configured to deform and partially penetrate the insulation jacket along a periphery thereof to secure the housing wall to the insulation jacket. In another aspect the engagement portion is comprised of a swagable material to secure the housing wall to the insulation jacket in fluid-tight sealed engagement therewith upon inward swaging of the engagement portion of the housing wall of the housing end portion to the insulation jacket. Where the swagable engagement portion includes inwardly projecting engagement members, the engagement portion is configured such that upon inward swaging of the engagement portion to the insulation jacket the engagement members are moved inward to deform and partially penetrate the insulation jacket along the periphery thereof to secure the housing wall to the insulation jacket in fluid-tight sealed engagement therewith.

In another aspect of the invention the connector further includes a conductor member configured to be secured to the housing, and to be secured to the stranded conductor and in electrical contact therewith. The conductor member may be configured to be positioned within the housing interior chamber. The conductor member may also be configured to be in fluid-tight sealed engagement with the housing. In disclosed embodiments the conductor member has a wall defining an interior member chamber with an open end, with the interior member chamber being sized to receive the stranded conductor therein and the member wall being of a crimpable material to secure the conductor member to the stranded conductor in electrical contact therewith upon inward crimping of the member wall. In some embodiments the housing and the conductor member are a unitary member.

In some embodiments the housing has an end portion with the housing wall thereof sized to receive at least a portion of the stranded conductor within the housing interior chamber with the cable segment extending from the housing end portion. An attachment means is provided for sealing the insulation jacket with respect to the housing wall and confining the fluid at the residual pressure within the housing interior chamber and the interstitial void volume, and for sufficiently securing the cable segment to the housing to prevent pushback of the insulation jacket at the residual pressure.

The attachment means may include a seal configured to seal the insulation jacket with respect to the housing wall to confine the fluid at the residual pressure within the housing interior chamber and the interstitial void volume, and a securing member configured to secure the cable segment to the housing, the securing member being capable of preventing pushback of the insulation jacket at the residual pressure.

In one aspect, the seal is configured to be positioned between the insulation jacket and the housing wall, and the securing member is configured to be positioned proximal to the housing end portion and attached thereto. The securing member has an aperture sized to receive the insulation jacket therethrough and has a grasping portion. The grasping portion has at least one inwardly, adjustably movable gripping member, with the gripping member protruding inwardly into the aperture sufficiently to contact and inwardly, deformingly engage a contacted portion of the insulation jacket with sufficient force when moved inwardly into engagement therewith to longitudinally immobilize the insulation jacket with respect to the housing during introduction of the fluid into an injection port and while the fluid is confined in the housing interior chamber at the residual pressure.

In another aspect the attachment means includes an end seal member having an aperture therethrough, with the end seal member configured to be in fluid-tight sealing engagement with an end face of the insulation jacket with the stranded conductor extending through the aperture and to be in fluid-tight sealing engagement with the housing. In one embodiment the end seal member has at least one hole sized to receive a fastener drivable into the insulation jacket to maintain the end seal member in fluid-tight sealing engagement with the end face of the insulation jacket and secure the end seal member to the insulation jacket. The end seal member may be configured to be positioned within the housing at the housing end portion, may be configured to be secured to the housing, and may be configured to be in fluid-tight sealing engagement with the housing.

In another embodiment the connector further includes a conductor member configured to be positioned within the housing interior chamber and secured to the housing. The conductor member is configured to be secured to the stranded conductor and in electrical contact therewith. A spring is positionable between the end seal member and an end portion of the conductor member to bias the end seal member into fluid-tight sealing engagement with the end face of the insulation jacket.

In some embodiments the connector is for connecting together first and second electrical power cable segments, and the housing has a wall defining first and second interior chambers. The housing first interior chamber is configured to be in fluid communication with a first interstitial void volume of the first cable segment, and the housing second interior chamber is configured to be in fluid communication with the second interstitial void volume of the second cable.

A first seal is configured to seal the first insulation jacket of the first cable segment with respect to the housing wall at a first end portion of the housing to confine a first fluid at a first residual pressure within the housing first interior chamber and the first interstitial void volume, and a second seal is configured to seal the second insulation jacket of the second cable segment with respect to the housing wall at a second end portion of the housing to confine a second fluid at a second residual pressure within the housing second interior chamber and the second interstitial void volume.

A first securing member is configured to secure the first cable segment to the housing at the first end portion of the housing to prevent pushback of the first insulation jacket at the first residual pressure, and a second securing member is configured to secure the second cable segment to the housing at the second end portion of the housing to prevent pushback of the second insulation jacket at the second residual pressure.

The connector may further include a conductor member configured to be secured to the first and second stranded conductors and in electrical contact therewith. The conductor member may be configured to be secured to the housing.

Other features and advantages of the invention will become apparent from the following detailed description, taken in conjunction with the accompanying drawings.

BRIEF DESCRIPTION OF THE SEVERAL VIEWS OF THE DRAWING(S)

FIG. 9 is a partial cross-sectional view of an axially retained high-pressure single housing splice connector having axial metal-to-plastic seals.

FIG. 9A is a detailed plan view of the face seal of FIG. 9.

FIG. 9B is a fragmentary, perspective view of an end portion of the connector of FIG. 9 showing the locking screw removed.

DETAILED DESCRIPTION OF THE INVENTION

Figure 1A:
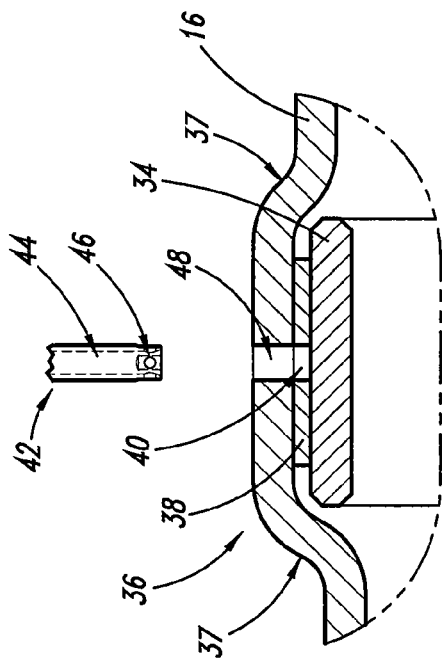
FIG. 1A is an enlarged, cross-sectional view of the self-closing spring-actuated injection valve of FIG. 1 and associated injection needle.

In order to solve some of the problems associated with the above described methods of restoring cables, the inventors of the instant application developed a method for treating electrical cables at sustained elevated pressure, described in detail in Provisional patent application Method for Treating Electrical Cable at Sustained Elevated Pressure, Ser. No. 60/549,322, filed Mar. 1, 2004 and Nonprovisional patent application by the same title filed concurrently herewith, which are incorporated herein by reference in their entirety. In brief, it was found that, when the interstitial void volume of a cable was filled with a tree-retardant fluid and the fluid confined therein at a high, sustained residual pressure, the volume of fluid actually introduced exceeded the volume predicted from a rigorous calculation of the cable's expansion commensurate with the imposed pressure. The difference between the observed and calculated volume change increased with pressure and was believed to be due mainly to the accelerated adsorption of the fluid in the conductor shield as well as transport thereof through the conductor shield and insulation of the cable. This was believed to be responsible for the remarkable improvement in the dielectric strength of aged cable observed after only one week of treatment. However, during development of the above method, it was found that using conventional connectors having FasTest® type seals, as described above, to inject the cable segments proved inadequate and resulted in fluid leakage when a high pressure was maintained for an extended period. Hence, there was a need to devise a suitable connector for introducing the fluid to the interstitial void volume of a cable as well as thereafter confining the fluid therein at a high residual pressure.

During development of the above-described method for treating electrical cable with a tree retardant fluid at sustained elevated pressure, the inventors of the instant application discovered a serious, and hitherto unappreciated, problem with conventional devices employed to inject cables. As previously noted, when relatively high pressure was employed in the past (e.g., injection of very long cable segments or on-the-reel cable injection), the pressure was always relieved after the cable segment was filled; Kellems grips (when used) and the injection adaptor were removed after injection since they were no longer needed. However, when the above described sustained pressure method was attempted using a FasTest® type connector, even when combined with a setscrew applied to the conductor, a new "pushback" phenomenon was discovered, as will be further discussed below. Pushback is defined herein as the axial movement of the insulation jacket and conductor shield away from the cut end (crimped end) of the conductor of a cable segment when a fluid is confined within its interstitial void volume at a high residual pressure. Without wishing to be limited by any particular theory or mechanism, it is believed that this pushback results from compression creep of the polymeric insulation and conductor shield, and slip of the latter with respect to the conductor under the axial load due to the prolonged high residual pressure. Thus, the likely reason that pushback was not observed with previous injection devices is that the injected fluid was never subjected to such a high pressure for such an extended period as there was no motivation to do so. Ultimately, this pushback phenomenon resulted in sufficient displacement of the insulation relative to the FasTest® seal to cause fluid to leak from the connection and the high residual pressure to quickly collapse, thereby destroying the intended results of the above novel method.

The present high-pressure connectors essentially eliminate the above pushback problem by employing an element having a sealing function in combination with an element having a securing function sufficient to overcome the force exerted by the confined fluid having a high sustained residual pressure. Thus, in general terms, the instant connector is either a high-pressure terminal connector or a high-pressure splice connector adapted to inject a fluid into the interstitial void volume of at least one electrical power cable segment at pressures up to about 1000 psig (pounds per square inch, gage), preferably from about 100 psig to 1000 psig, but below the elastic limit of the insulation at contemplated operating temperature, and thereafter confine the fluid within the interstitial void volume at a residual pressure for an extended period without producing the above described pushback of the insulation. This period varies from several days to several months and depends on the rate of decay of the pressure which depends, in turn, upon the initial residual pressure, the permeation characteristics of the fluids injected, the geometry of the cable, and the temperature at which the cable operates. During this period, the residual pressure decays as the fluid diffuses radially through the conductor shield and insulation jacket of the cable—but not as a result of fluid leaking through the seal(s).

The high-pressure terminal and splice connectors are explained further below with reference to the drawings illustrating exemplary embodiments thereof.

A first general embodiment of the present high-pressure connector is a swagable splice connector wherein the above-mentioned sealing and securing functions are simultaneously accomplished by swaging operations at opposite ends of the splice connector housing. This high-pressure splice connector is designed for joining a first electrical cable segment and a second like electrical cable segment, each cable segment having a respective central stranded conductor, optionally surrounded by a conductor shield, encased in a polymeric insulation jacket and having an interstitial void volume. The conductors are joined at an end of each segment by a splice crimp connector in electrical communication with each conductor. The swagable high-pressure splice connector is suited for introducing a fluid into the interstitial void volume of at least the first cable segment and confining the fluid therein at a residual pressure above atmospheric, but below the elastic limit of the polymeric insulation. The swagable high-pressure splice connector includes a tubular housing positioned essentially in coaxial alignment with the cable segments and optionally has at least one injection port for introducing the fluid. The housing has an inner diameter sized to receive the splice crimp connector and the insulation jacket of the first and second cable segments therethrough and has a length sufficient to at least overlap a portion of each insulation jacket. The housing is further swagable against each respective insulation jacket along at least one outer circumference thereof at a position proximal to each end of the housing so as to provide a fluid-tight seal with respect to each insulation jacket and to essentially axially immobilize each cable segment with respect to the high-pressure splice connector during the introduction of the fluid and while the fluid is confined in the interstitial void volume at the residual pressure. In this aspect, both cable segments can be injected simultaneously using appropriate fitting(s) and injection port(s). Alternatively, both segments can be injected sequentially starting at an end of the first segment distal to the high-pressure splice connector, through the high-pressure splice connector and then through the second segment (flow-through mode). In this, and any other so-called flow-through mode use of the instant high-pressure connectors, the injection port(s) of the housing may be eliminated.

As used herein, the term "elastic limit" of the insulation jacket of a cable segment is defined as the internal pressure in the interstitial void volume at which the outside diameter of the insulation jacket takes on a permanent set at 25° C. greater than 2% (i.e., the OD increases by a factor of 1.02 times its original value), excluding any expansion (swell) due to fluid dissolved in the cable components. This limit can, for example, be experimentally determined by pressurizing a sample of the cable segment with a fluid having a solubility of less than 0.1% by weight in the conductor shield and in the insulation jacket (e.g., water), for a period of about 24 hours, after first removing any covering such as insulation shield and wire wrap. After the pressure is released, the final OD is compared with the initial OD in making the above determination. For the purposes herein, it is preferred that the above mentioned residual pressure is no more than about 80% of the above defined elastic limit.

Another version of the above swagable high-pressure splice connector contemplates the situation wherein the tubular housing comprises a deformable central portion positioned essentially over the splice crimp connector, the central portion being swagable against the splice crimp connector along at least one outer circumference portion thereof so as to provide a fluid-tight seal therewith and wherein at least one injection port is positioned between the splice crimp connector and an end of the housing. Alternatively, a bushing having O-ring seals may be interposed between the splice stand connector and the housing's inner periphery and the housing swaged thereto. In this version, each cable segment can be injected independently since the swage over the splice crimp connector prevents fluid communication between the interstitial void volumes of the respective cable segments and secures the housing with respect to each conductor.

As used herein, swaging or "circumferential crimping" refers to the application of radial, inwardly directed compression around the periphery of the housing over at least one selected axial position thereof. This swaging operation produces a circular peripheral indented region (e.g., a groove or flat depression) on the outer surface of the housing and inwardly projects a corresponding internal surface thereof into the insulation jacket (or bushing or splice crimp connector) so as to partially deform the latter at a periphery thereof. Swaging can be accomplished by various methods known in the art. For example, a conventional pipe cutter can be modified by replacing the sharp die thereof with a rounded or flattened die of appropriate dimension. This modified tool can then be employed in a manner similar to a pipe cutting operation wherein the die is forcefully urged inwardly toward the housing surface in a radial direction in successive increments as it is rotated about the housing. Preferably, a commercially available circumferential crimping or swaging tool is used, such as the CableLok™ radial swaging tool offered by Deutsch Metal Components, Gardena, Calif. and described in U.S. Pat. Nos. 3,848,451 and 5,069,058. Swaging is to be distinguished from a normal crimping operation, wherein one-point (indent crimp), two-point or multi-point radial crimps are applied to join crimp connectors using tools well known in the art (e.g., the crimp connectors attached to the conductor). The resulting crimp from such a single or multi-point crimping operation is referred to simply as "crimp" herein and may be accomplished with shear bolts applied to mechanical connectors and cable lugs as are offered by GPH GmbHG, Hof/Saale, Germany.

In another aspect, the present connector is a high-pressure swagable terminal connector similar to the swagable high-pressure splice connector, described above. Thus, there is presented a swagable high-pressure terminal connector for an electrical cable segment having a central conductor, optionally surrounded by a conductor shield, encased in a polymeric insulation jacket and having an interstitial void volume. The conductor is attached to a termination crimp connector in electrical communication therewith. The high-pressure terminal connector is suited for introducing a fluid into the interstitial void volume of the cable segment and confining the fluid therein at a residual pressure above atmospheric, but below the elastic limit of the polymeric insulation. The high-pressure terminal connector includes a tubular housing positioned essentially in coaxial alignment with the cable segment, wherein the housing optionally has at least one injection port for introducing the fluid and has an inner diameter sized to receive the termination crimp connector and the insulation jacket therethrough. The housing further has a length sufficient to overlap at least a portion of the insulation jacket and the termination crimp connector, and is swagable against the termination crimp connector along at least one outer circumference thereof at a position proximal to a first end of the housing so as to provide a fluid-tight seal with respect to the termination crimp connector. The housing is further swagable against the insulation jacket along at least one outer circumference thereof at a position proximal to a second end of the housing so as to provide a fluid-tight seal with respect to the insulation jacket as well as to essentially axially immobilize the insulation jacket of the cable segment with respect to the high-pressure terminal connector during the introduction of the fluid and while the fluid is confined in the interstitial void volume at the residual pressure.

In the above high-pressure terminal connector, the termination crimp connector should be mechanically secured to the housing in order to restrict relative movement therebetween. This can be readily accomplished, e.g., by swaging or crimping the housing to the termination crimp connector, by providing a shoulder on the termination crimp connector or by applying a setscrew over the terminal crimp connector. It is further contemplated herein that a similar means is employed to secure the splice crimp connector to the housing of a high-pressure splice connector when injecting only one side of the latter or injecting both sides of the latter at different times or pressures where there would be an imbalance of hydraulic forces.

Figure 1B:
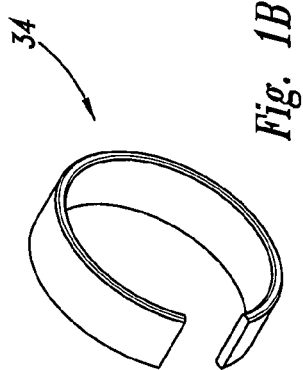
FIG. 1B is a perspective view of the C-spring of FIGS. 1 and 1A.
Figure 1:
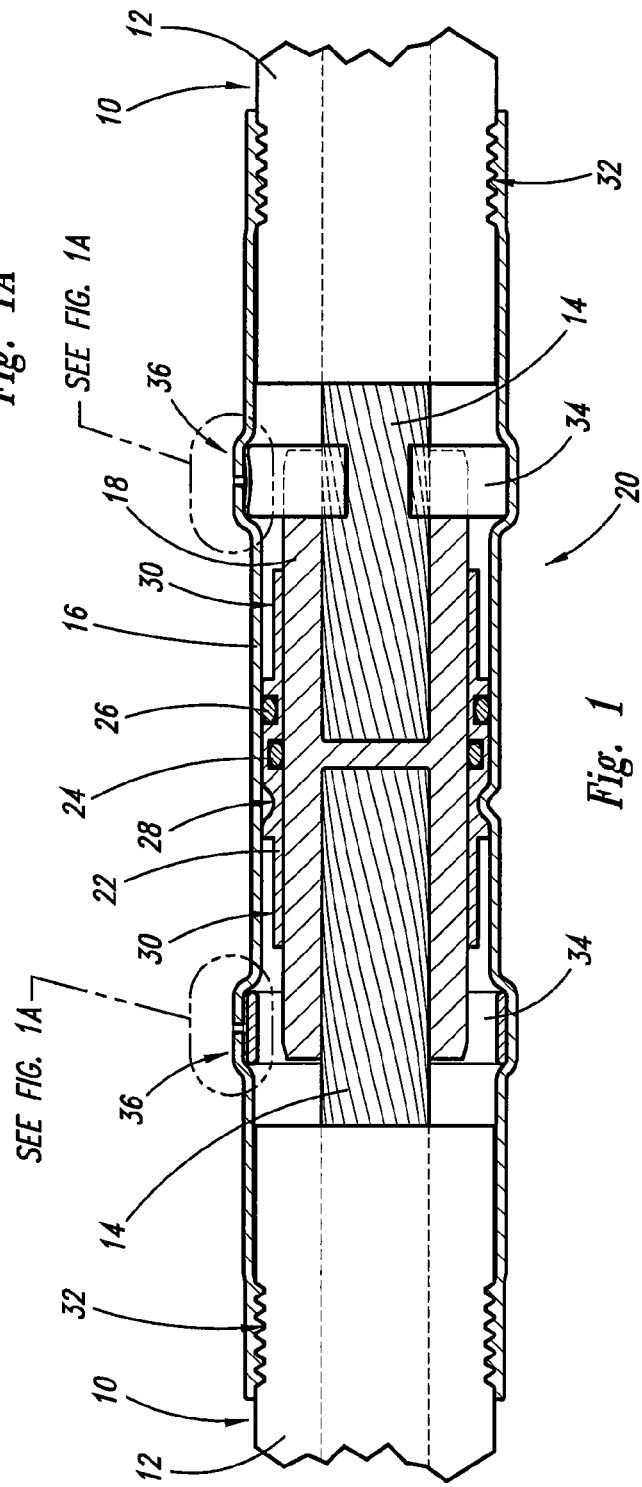
FIG. 1 is a partial cross-sectional view of a swagable high-pressure, single housing splice connector having circumferential machined teeth in the swaging regions.

A specific embodiment of the above high-pressure swagable splice connector is illustrated in FIGS. 1, 1A and 1B for the case of two stranded conductor cable segments. In these, as well as other figures herein, the same reference numerals are applied to identical or corresponding elements. In a typical assembly procedure according to this embodiment, swagable high-pressure splice connector 20 is used to connect two cable segments 10, these being referred to with respect to the figures herein as left and right cable segments. Each cable segment 10 is first prepared for accepting splice crimp connector 18 by cutting back the outermost layers of cable segment 10, including the jacket when present (not shown), the neutral conductors (not shown) and the insulation shield (not shown), to accommodate cutback requirements per the component manufacture's recommendations. Similarly, the insulation jacket 12 and conductor shield (not shown) of cable segment 10 is cut back to expose each strand conductor 14 to the manufacturer's requirements.

Housing 16 is sized so that its ID (inner diameter) is just slightly larger than the OD (outer diameter) of insulation jacket 12 and is configured to receive the end portion of both cable segments 10 therein. Housing 16, having a pair of self closing spring-actuated valves 36 (illustrated in detail in FIG. 1A) disposed at injection ports 48 for introduction of the restoration fluid, is slid over insulation jacket 12 to either the right or the left of the exposed strand conductors 14 to allow installation of the splice crimp connector 18 and bushing 22, as described below. Bushing 22, having an ID slightly larger than the OD of splice crimp connector 18 and OD slightly smaller than the ID of housing 16, is slid onto and centered on splice crimp connector 18 such that O-ring 24, which resides in a channel in bushing 22, is directly over the central non-crimped portion thereof. Bushing 22 includes a skirt 30 at both ends thereof which is simultaneously crimped during the crimping operation that joins splice crimp connector 18 to conductor 14 (i.e., the bushing, splice crimp connector and strand conductors are crimped together in one operation). This three-piece crimping brings conductor 14, splice crimp connector 18, and bushing 22 into intimate mechanical, thermal and electrical union and contact due to the respective deformations. The crimps joining bushing skirts 30, splice crimp connector 18 and conductor 14 can be of any variety well known in the art, such as two-point, hexagonal or other suitable means that assure that the ampacity of the connection meets the relevant standards and requirements of the connector manufacturer. O-ring 24, which is compressed by the tight fit over splice crimp connector 18, makes a fluid-tight seal between bushing 22 and splice crimp connector 18.

Housing 16 is then slid over insulation jacket 12 and centered over the bushing 22 and splice crimp connector 18. A crimp is made on the exterior of the housing 16 at a position measured from the center of housing 16 to be directly over a bushing indent 28 of the bushing 22 (shown being formed using a roller 270 in FIG. 14 for the embodiment of the connector shown in FIG. 2). This assures that crimping occurs directly over bushing indent 28 to electrically, thermally, and mechanically join housing 16 and the bushing 22. An O-ring 26, residing in a channel in bushing 22, is sized to make a fluid tight seal between housing 16 and bushing 22. When the high-pressure splice connector of this embodiment is to be used to inject both cable segments simultaneously (e.g., in a flow-through mode), at least O-ring 26 is omitted and, preferably, both O-rings 26 and 24 are omitted. It should be noted that the central crimp over indent 28 is only made at one or more points (i.e., not a circumferential crimp or swage, which would restrict the flow rate of fluid past the bushing) to make a mechanical, electrical and thermal connection between splice crimp connector 18 and housing 16 through the bushing 22. Alternatively, bushing 22 could itself be eliminated and housing 16 crimped (i.e., multi-point crimped) directly to splice crimp connector 18 to provide the mechanical/electrical/thermal union and contact.

Figure 2:
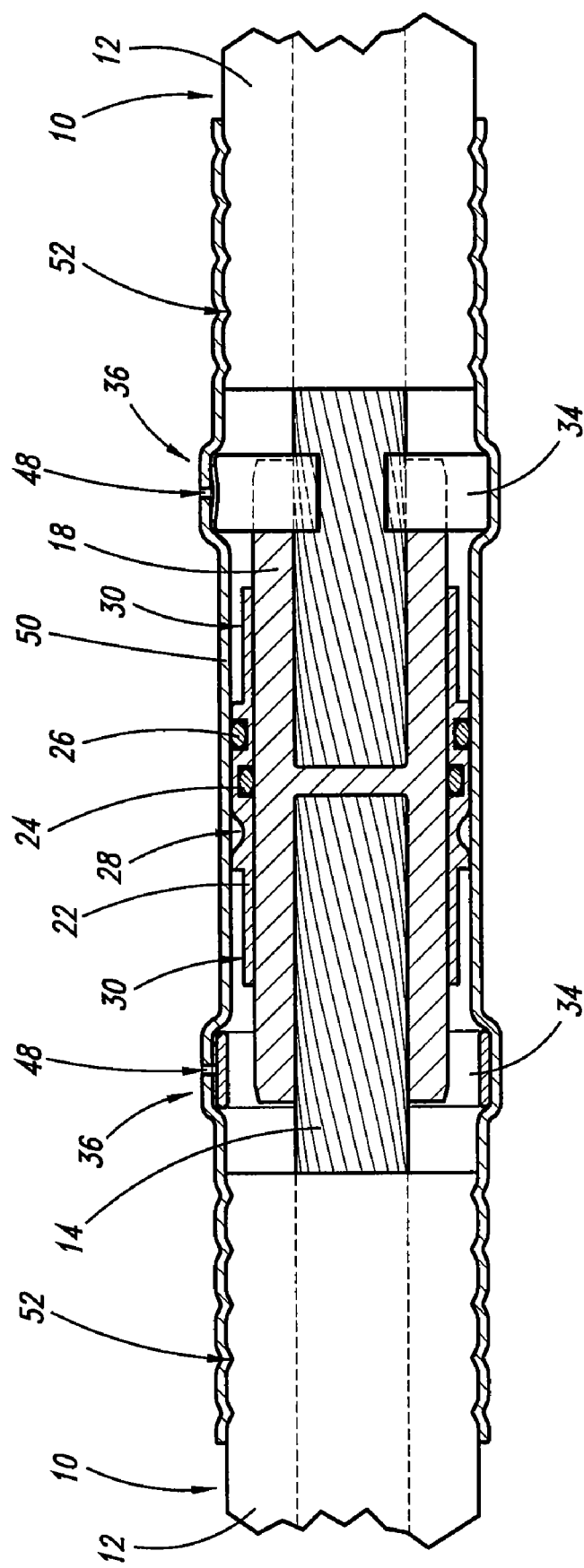
FIG. 2 is a partial cross-sectional view of a swagable high-pressure, single housing splice connector having circumferentially formed indentations in the swaging regions.
Figure 14:
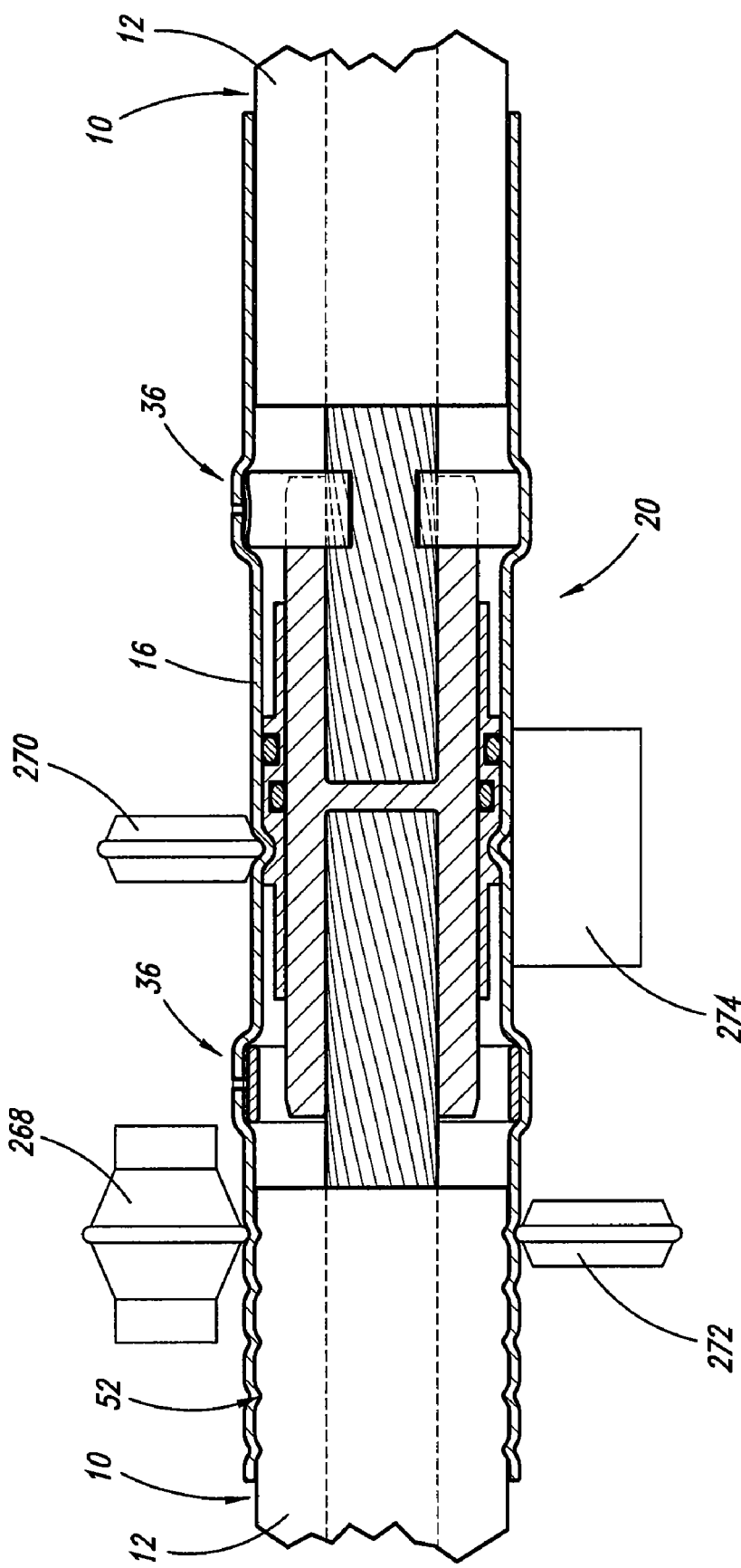
FIG. 14 is the swagable high-pressure, single housing splice connector of FIG. 2 showing the swaging of the housing to the insulation jacket and the crimping of the housing to the bushing positioned on the spice crimp connector.

After housing 16 is placed in the position shown in FIG. 1, swages are applied to the periphery of the end portions of the housing 16 over circumferential teeth 32 (such as shown in FIG. 14 being formed for one end portion using a swaging roller 268 for the embodiment of the connector of FIG. 2). The end portions of the housing 16 are swaged to place them firmly and securely against the insulation jacket 12 with sufficient force that the teeth 32 deform and partially penetrate each insulation jacket along a periphery thereof and also simultaneously form a fluid-tight seal with the insulation jacket, thus providing a seal and preventing pushback of the insulation jacket when one or both of the cable segments are subjected to sustained interior pressure. The circumferential wall end portion of the housing 16, at least in the periphery of the housing in the area of the circumferential teeth 32, is made of a deformable material to allow inward swaging thereof onto the insulation jacket 12 of the cable segment therein and subsequent grasping of the cable segment sufficient to longitudinally immobilize the insulation jacket with respect to the housing during introduction of the fluid into the injection port and while the fluid is confined in the housing interior chamber at the residual pressure, and to produce fluid-tight engagement between the swaged deformable material and the insulation jacket.

At least one and preferably two injection ports 48 and associated valves 36 are employed to allow the injection of fluid at one end of each cable segment and the withdrawal of water and contaminated fluid from the other, remote end of the respective cable segment. Thus, each injection port may be utilized from either side (or both sides) of the splice crimp connector 20 to inject or withdraw fluid. Self-closing spring-actuated valve 36, shown in detail in FIG. 1A, comprises C-shaped spring element 34 (shown in perspective view in FIG. 1B). Spring 34 has an elastomeric gasket 38 bonded thereto and is positioned essentially under injection port 48 of housing 16. Gasket 38 preferably has a hole 40 which is aligned with similarly sized injection port 48 such that a hollow injection needle 42, shown in FIG. 1A, having side port(s) 46 may be inserted through injection port 48 and hole 40 to contact spring 34. The needle 42 assures alignment of gasket 38 with respect to port 48 even if the bonding were to fail from chemical attack or high fluid shear forces during injection.

The self-closing valve 36 is positioned within the housing interior chamber in an interior recess 37 extending circumferentially thereabout at the injection port 48. The C-shaped spring element 34 is at least partially received in the recess 37 and in co-axial alignment with the housing interior chamber. The spring element 34 is resiliently movable between a closed position and an open position.

When the injection needle 42 is withdrawn or is not present, spring element 34 compresses gasket 38 against the inner surface of housing 16 to form a fluid-tight seal therewith and thereby close the injection port 48. To inject or withdraw fluid from the housing using such a valve, hollow needle 42 is pressed inward against the spring element 34 to deflect it and move the gasket 38 inward away from the injection port 48, whereupon injection can proceed. In practice, the injection needle employs a suitable locking mechanism, such as a clamp or threaded portion (not shown) which is positioned over injection port 48 to temporarily hold the needle 42 in place and provide a seal with respect to housing 16 during injection. This locking mechanism can be either integral with port 48 (e.g., threads in housing 16) or, preferably, a clamped jig can be positioned on the outer surface of housing 16 essentially over the injection port 48. After injection is completed, this needle 42 is withdrawn and spring 34 returns gasket 38 to a sealing position against the housing 16 interior.

In the above, as well as other embodiments of the instant high-pressure splice connectors, it is preferred that the strands of the conductors 14 being joined by a crimping operation are first straightened to an orientation essentially parallel to the axis of the cable segments 10 to facilitate fluid flow into and out of the respective interstitial volume(s). Thus, in the above embodiment, the bushing/splice crimp connector combination 22/18 is first crimped to one conductor 14, such as the conductor of the left cable segment 10, to be in mechanical, electrical and thermal integrity therewith. The bushing/splice crimp connector combination 22/18 is next rotated approximately 15 degrees to first straighten the original lay of the outermost layer of strands of that conductor, and then 15 more degrees, rotation being opposite to initial strand twist direction. The bushing/splice crimp connector combination 22/18 is next crimped to the conductor 14 of the right cable segment 10. The bushing/splice crimp connector combination 22/18 is then rotated back (i.e., in the initial strand twist direction of the first conductor) approximately 15 degrees to straighten the lay of the outermost layer of the strands of the second conductor. Of course, the first conductor will also be rotated by this operation, thereby eliminating the counter lay of the left conductor and the original lay of the right conductor. All grease and dirt are cleaned from the straightened connectors.

In the above embodiment, teeth 32 comprise a plurality of triangular circumferential grooves machined along the inner surface of housing 16 at each end thereof (i.e., the portions of the housing where swaging against insulation jacket 12 is to be applied). While the inside surface of the housing 16 of FIG. 1 is shown with machined teeth 32, for the purposes herein, the inside surface of housing 16 can be threaded, serrated, ribbed or even smooth, provided the crimping operation deforms the housing 16 and insulation jacket 12 sufficiently to provide the aforementioned sealing and securing functions. This inside surface of housing 16 can also have undulating roughness or have inwardly directed tabs or protrusions, as will be described further below. Further, it is possible to introduce one or more rubber O-rings or another suitable elastomeric seal disposed between the insulation jacket 12 and the housing 16 inside surface, as shown in the embodiment of FIG. 3 below, and to swage the housing at a peripheral surface adjacent to one or both sides of the O-ring, thereby providing a redundant sealing function.

A modification of the swagable high-pressure splice connector described in FIG. 1 is illustrated in FIG. 2, wherein the machined teeth 32 of FIG. 1 have been replaced with formed indentations 52 on the housing 50 which perform functions identical thereto. The indentations 52 are shown in FIG. 14 being formed in the housing using a swaging roller 268. While the pre-formed indentions 52 can be omitted and the housing directly swaged to the insulation jacket 12, the pre-formed indentations 52 are preferred. Thus, without being limited by any particular theory, it is believed that the sharper edges formed during manufacturing utilizing tooling on both the outside and the inside of the housing 50 surfaces results in reduced pushback of the insulation jacket 12.

Figure 3:
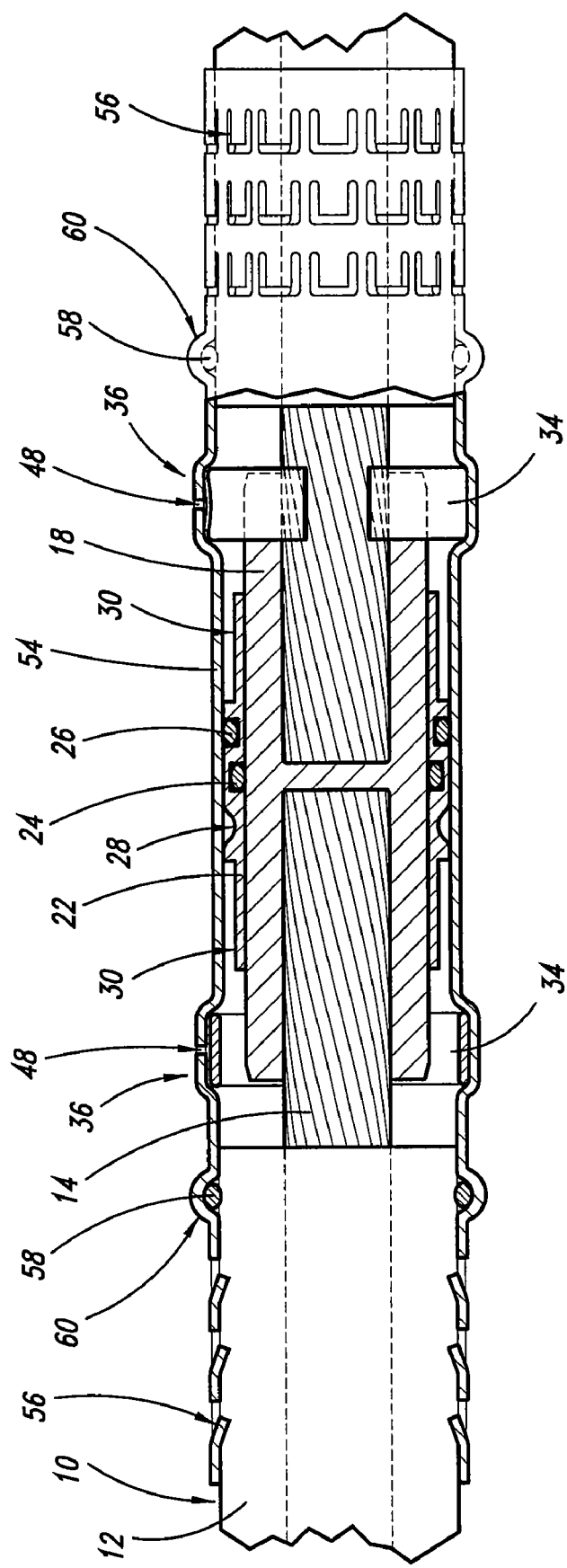
FIG. 3 is a partial cross-sectional view of a swagable high-pressure, single housing splice connector employing O-ring seals and having machined teeth in the swaging regions.

In another variation of the above swagable high-pressure splice connector, illustrated in FIG. 3, the machined teeth 32 of FIG. 1 have been replaced with a plurality of cut (e.g., milled or stamped) rectangular tabs 56, which are inwardly crimped to penetrate insulation jacket 12, provide the securing function and eliminate pushback. This is a variation of an ordinary point crimp and preferably employs a special tool to depress each tab 56 into the insulation jacket 12. Alternatively, tabs 56 can be swaged to provide the securing function as the softer plastic insulation will move through the grooves around each tab 56 providing a secure lock. Additional inward tab deflection can be accomplished during swaging to further improve the holding performance by a manufacturing process which leaves each tab 56 thicker on the outside diameter than the thickness of the housing 54. Of course, the shape of the above-described tabs can be adjusted (e.g., triangular, scalloped) to provide the necessary securing function. An O-ring 58 is positioned within a formed groove 60 of housing 54 to perform the sealing function with the insulation jacket 12.

Figure 4:
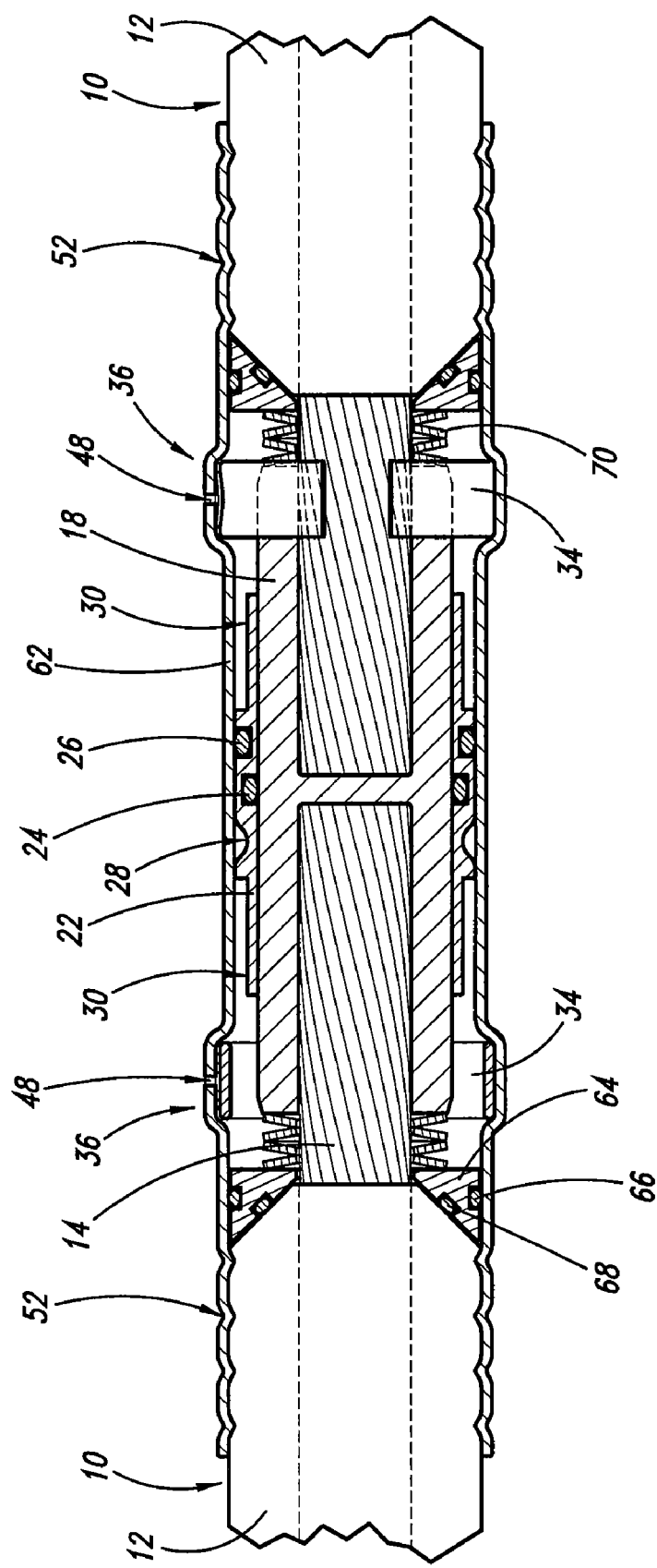
FIG. 4 is a partial cross-sectional view of a swagable high-pressure, single housing splice connector employing spring-actuated beveled axial O-ring seals and having circumferentially formed indentations in the swaging regions.

In another embodiment of the above swagable high-pressure splice connector, illustrated in FIG. 4, the teeth 32 of FIG. 1 have again been replaced with swagable formed indentations 52 which restrain the insulation from push-back and act as a backup seal. In this case, the primary seal is a spring-actuated beveled metal washer 64 having at least one O-ring 66 to provide a fluid-tight seal with the inside surface of housing 62. Additionally, washer 64 has at least one O-ring 68 to provide a fluid-tight seal with a beveled end portion of insulation jacket 12, the O-rings being seated in corresponding grooves in beveled washer 64, as shown in FIG. 4. Beveling of the insulation jacket 12 may be accomplished with penciling tools well known in the art and is performed as the last step in the preparation of the ends of cable segments 10.

In application, housing 62 of FIG. 4, which is sized as described above and includes injection valves similar to those illustrated in FIG. 1, is slid over insulation jacket 12 to either the right or the left, as described for the embodiment of FIG. 1. Beveled washer 64, along with its two preinstalled O-rings 66 and 68, is slid over the conductor 14 of each (i.e., right and left) cable segment 10. Spring 70 is next slid over each conductor 14 and positioned against the beveled washers 64. Bushing 22, sized as previously described, is slid onto and centered on splice crimp connector 18 such that O-ring 24 is directly over the center non-crimped portion thereof. Just before a crimp is applied to each of the bushing skirts 30 of the bushing 22, the bushing 22 and splice crimp connector 18 are, as a unit, forced against the spring such that spring 70 is fully compressed when crimping is complete, thereby preloading O-ring 68 and providing for a thermally induced or mechanically induced movement of the beveled surface of insulation jacket 12 away from splice crimp connector 18 were the insulation jacket 12 to move longitudinally away therefrom. As recited above, when the high-pressure splice connector of this embodiment is to be used in a flow-through mode, at least one and preferably both O-rings 24 and 26 are omitted. As further described above, swages are applied to the exterior of housing 62 over formed indentations 52 such that the latter, as well as insulation jackets 12, are sufficiently deformed so as to form a fluid-tight seal as well as prevent pushback of the insulation jacket when the cable segment(s) is/are pressurized.

Figure 5:
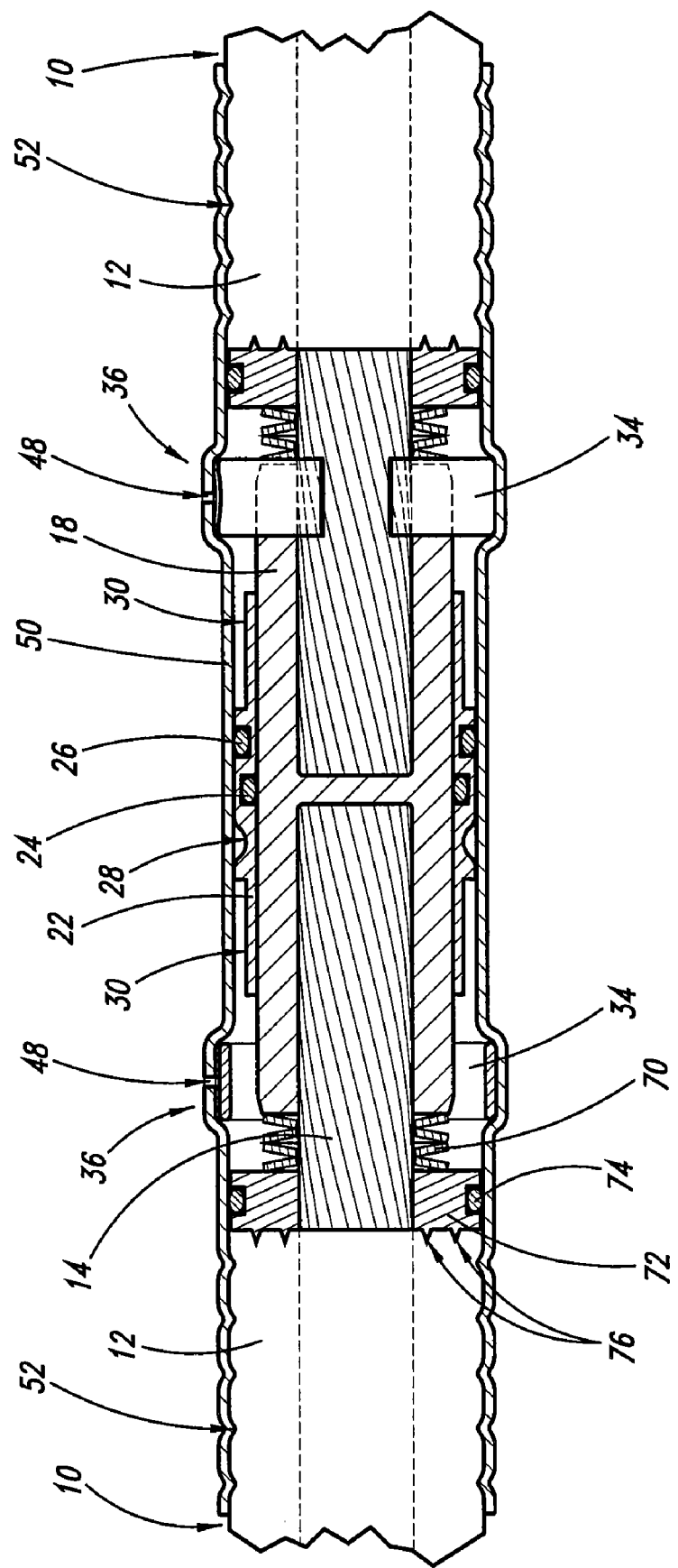
FIG. 5 is a partial cross-sectional view of a swagable high-pressure, single housing splice connector employing spring-actuated axial metal-to-plastic seals and having circumferentially formed indentations in the swaging regions.

In another embodiment of the above swagable high-pressure splice connector, illustrated in FIG. 5, beveled washer 64 and the O-ring 66 of FIG. 4 have been replaced with toothed washer 72 and associated O-ring 74. The toothed washer 72 has one or more axially projecting, concentrically arranged circular face teeth 76. The installation according to this embodiment proceeds in a manner similar to that described in connection with FIG. 4. In this case, sufficient axial force is applied to spring 70 and, in turn, washer 72 prior to crimping the bushing skirts 30 of the bushing 22 and splice crimp connector 18 to conductor 14 such that spring 70 is fully compressed and circular face tooth/teeth 76 is/are fully embedded into the end face of insulation jacket 12 to provide additional sealing function when the swaging over formed indentations 52 is complete.

Those skilled in the art will appreciate the advantage of the above spring-containing high-pressure splice connectors. Prior art devices employing a seal compressed by only axial threading (e.g., above cited FasTest® type seals) placed a pre-determined load on an elastomeric component, such as shown in the seal formed by adjacent washers 212, 214 and 212 at one end of the high-pressure splice connector shown in FIG. 10, described further below. These compression seals do not allow for differential thermal expansion or lead to gradual extrusion (compression set) of the elastomer. To the contrary, the above spring-loaded high-pressure splice connectors employing a spring to provide a near constant deformation force provide a durable seal which can accommodate a wider dynamic range of thermal cycling and elastomer creep. In general, a spring has a greater dynamic range than a compressed elastomer. Furthermore, these spring-loaded designs assure improved long term performance since the nearly constant spring force will not allow over tightening of elastomeric seals, and therefore reduce overall compression set of the elastomer.

Figure 6:
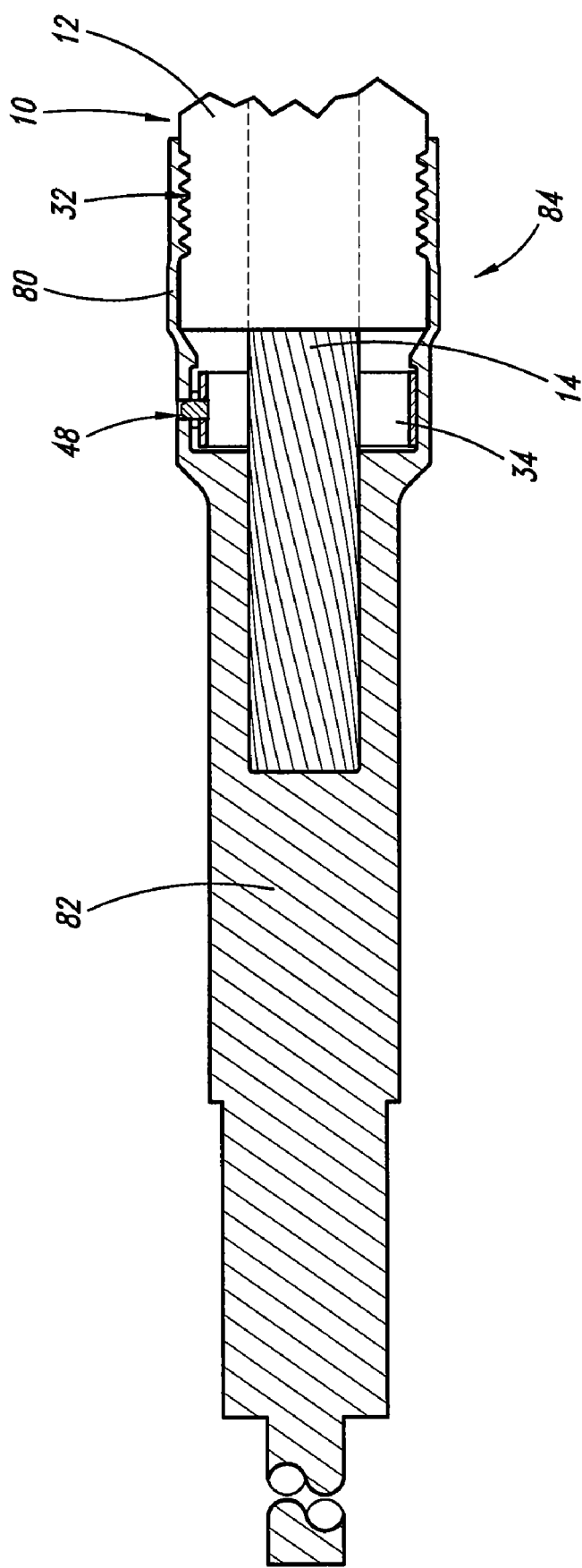
FIG. 6 is a partial cross-sectional view of a swagable high-pressure, integral housing terminal connector having machined teeth in the swaging regions.

Of course, those skilled in the art will recognize that any of the above high-pressure splice connectors employing various sealing/securing means may be modified to provide a high-pressure terminal connector. This is accomplished by simply replacing the splice crimp connector with a termination crimp connector and forming a fluid-tight seal between the housing and the latter, the termination crimp connector also being secured to the housing. Furthermore, the termination crimp connector and the housing can be integral such that no additional seal is required between the housing and the termination crimp connector, as illustrated in FIG. 6. In this high-pressure terminal connector 84 of FIG. 6, a housing 80, having internal teeth 32 and injection port 48, is integral with a termination crimp connector portion 82 thereof. In application, the termination crimp connector portion 82 is crimped to conductor 14 at an overlapping region to secure it thereto and provide electrical communication therewith. As in previous embodiments, housing 80 is swaged in the region of circumferential teeth 32 to provide the sealing and securing functions with respect to insulation jacket 12.

Figure 6A:
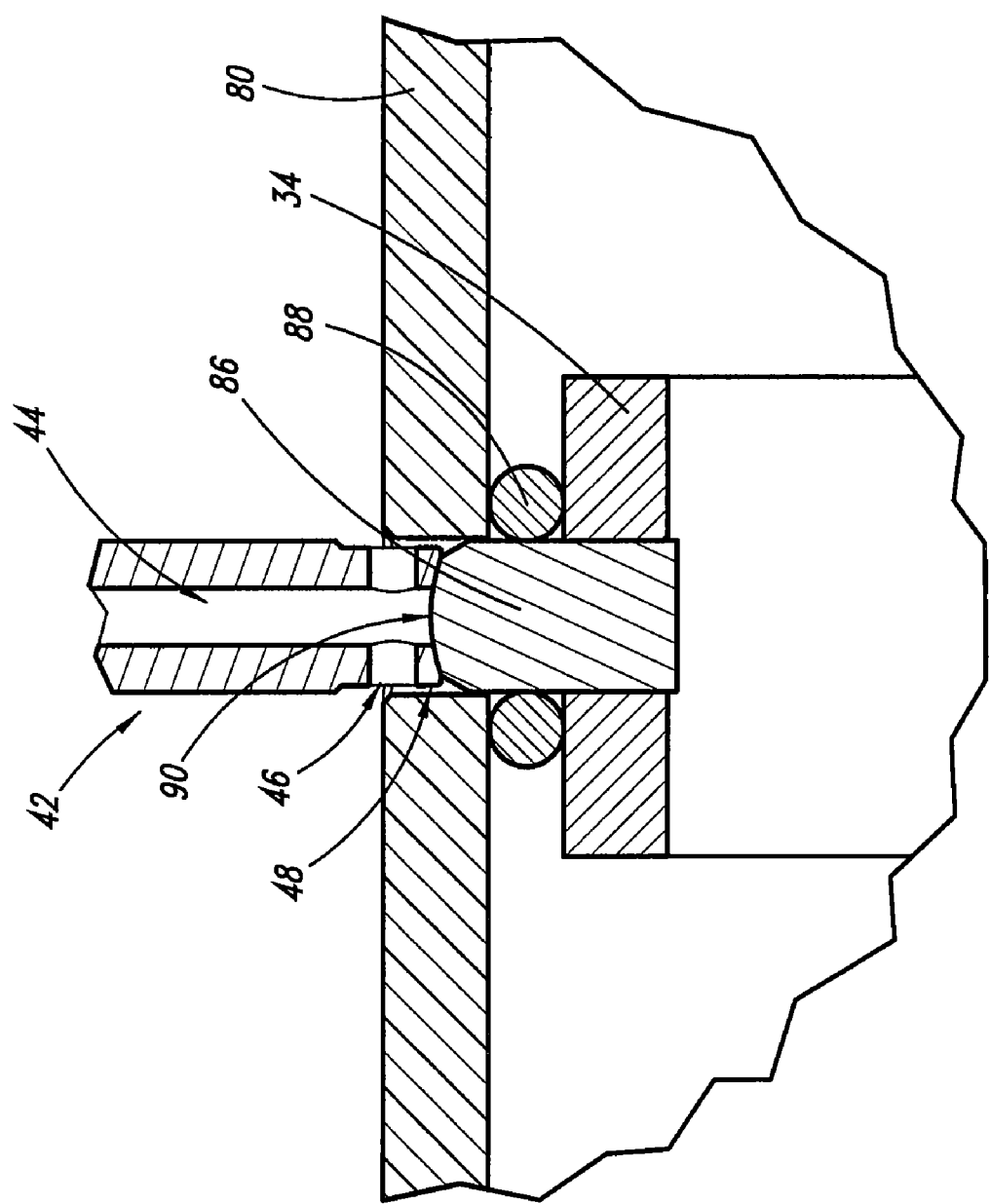
FIG. 6A is an enlarged, cross-sectional view of the self-closing spring-actuated injection valve of FIG. 6 and an associated injection needle used to supply fluid to the high-pressure terminal connector.

In the embodiment of FIG. 6, the injection valve 36 of FIG. 1A has been slightly modified to illustrate a variation thereof and is shown in enlarged view in FIG. 6A. In this variation, hollow injection needle 42 having side port(s) 46 and injection channel 44 is shown in position just prior to injecting a pressurized fluid. Needle 42 includes a concave portion at its tip which mates with a corresponding convex profile 90 on plug-pin 86, the latter being attached to C-shaped spring 34. This mating assures that plug-pin 86 is centered in, and just displaced from, injection port 48 while needle 42 is inserted and likewise centers the plug-pin 86 in the injection port 48 of housing 80 as the needle 42 is withdrawn. The convex and concave surfaces could, of course, be reversed and other shapes could be utilized to achieve the same effect. Plug-pin 86 and O-ring 88 in combination provide a fluid-tight seal when the needle tip is withdrawn and the force exerted by C-shaped spring 34 presses against O-ring 88 so as to deform the latter into a slight saddle shape, whereby the O-ring 88 seats against the inside surface of the housing 80 and the outside surface of C-shaped spring 34. It will be appreciated that, as the pressure within the housing 80 increases, the compressive force on the O-ring 88 increases and thereby improves the sealing performance of O-ring 88. In practice, a clamp assembly which houses needle 42 is mounted over injection port 48 to form a fluid-tight seal to the exterior of housing 80, as recited above. As the tip of needle 42 is actuated and inserted into injection port 48, thereby depressing plug-pin 86 and unseating O-ring 88, fluid can be injected into, or withdrawn from, the interior of housing 80 through needle 42.

Figure 7:
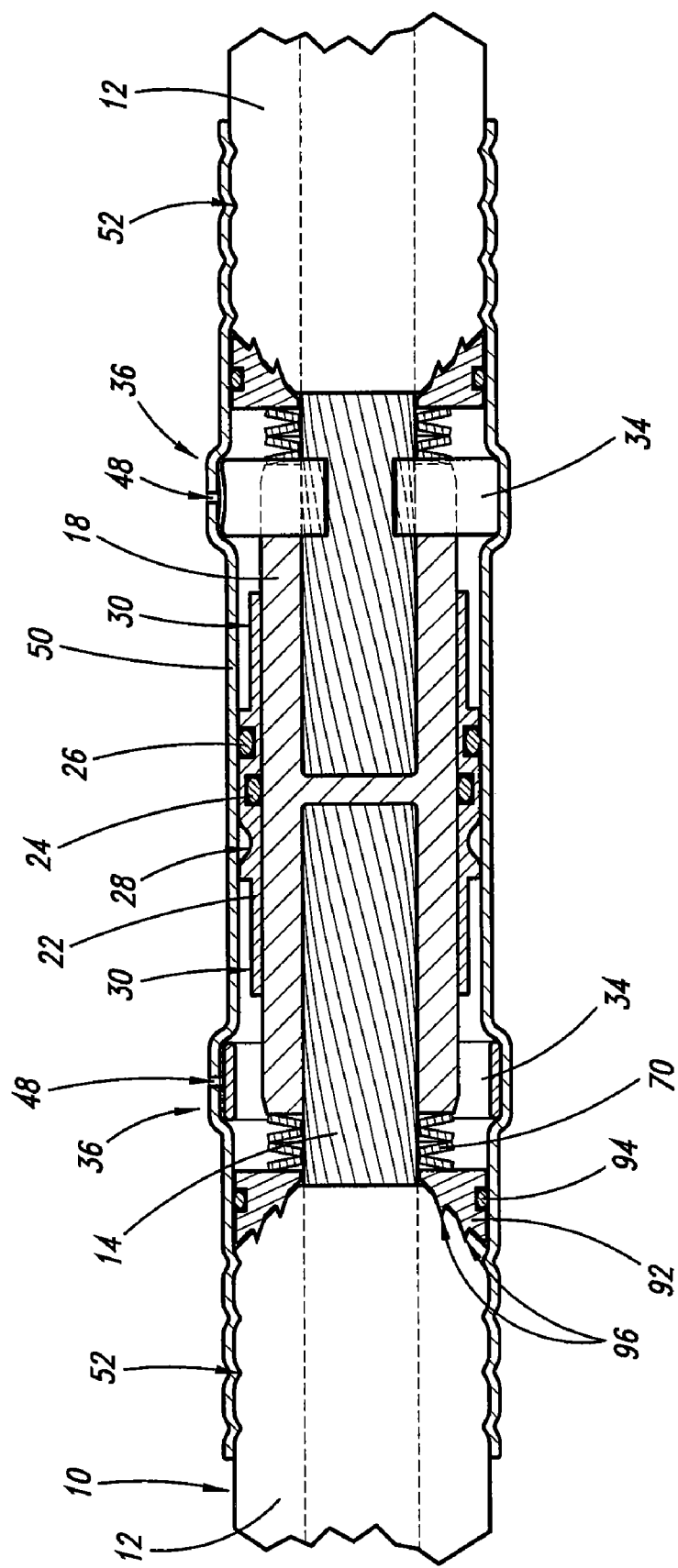
FIG. 7 is a partial cross-sectional view of a swagable high-pressure, single housing splice connector employing spring-actuated beveled axial metal-to-plastic seals and having circumferentially formed indentations in the swaging regions.

In another embodiment of a high-pressure swagable splice connector, illustrated in FIG. 7, beveled washer 64 of FIG. 4 has been replaced with toothed beveled washer 92 having one or more axially projecting, concentrically arranged circular face teeth 96 to provide the sealing function against a beveled end of insulation jacket 12 while O-ring 94 provides the seal against the interior of housing 50.

Figure 8:
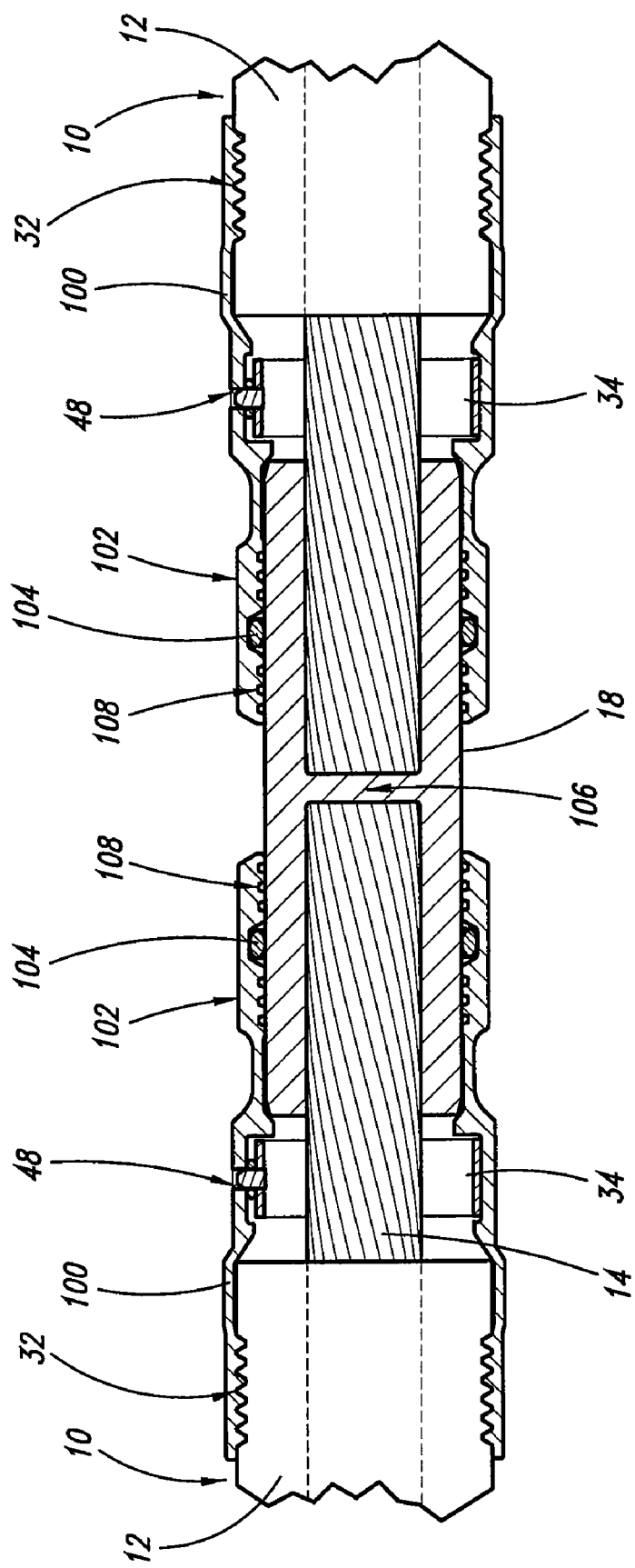
FIG. 8 is a partial cross-sectional view of a swagable high-pressure, dual-housing splice connector having machined teeth in the swaging regions.

A dual-housing, swagable high-pressure splice connector, which can be assembled from two identical swagable high-pressure terminal connectors, is illustrated in FIG. 8. In a typical assembly procedure using this embodiment, described here for one of the two cable segments 10 shown in FIG. 8, the insulation jacket 12 is first prepared for accepting splice crimp connector 18, as described above. Housing 100, which includes injection port 48, is sized such that its larger ID at one end portion is just slightly larger than the OD of insulation jacket 12 and its smaller ID at an opposite end portion is just slightly larger than the OD of splice crimp connector 18. The housing 100 is slid over the corresponding conductor 14 and insulation jacket 12, and the splice crimp connector 18 is then slipped over the end of the conductor 14 and within the housing. As described previously, the lay of the outermost strands of conductor 14 of each cable segment 10 is straightened. Housing 100, having O-ring 104 residing in a groove therein, is swaged with respect to splice crimp connector 18. The swage is applied at position 102 over the O-ring 104 and the machined teeth 108, which may have a profile varying from roughly triangular to roughly square. This swaging operation joins the conductor 14, splice crimp connector 18, and housing 100 in intimate mechanical, thermal and electrical union and contact and provides a redundant seal to the O-ring 104.

Figure 13:
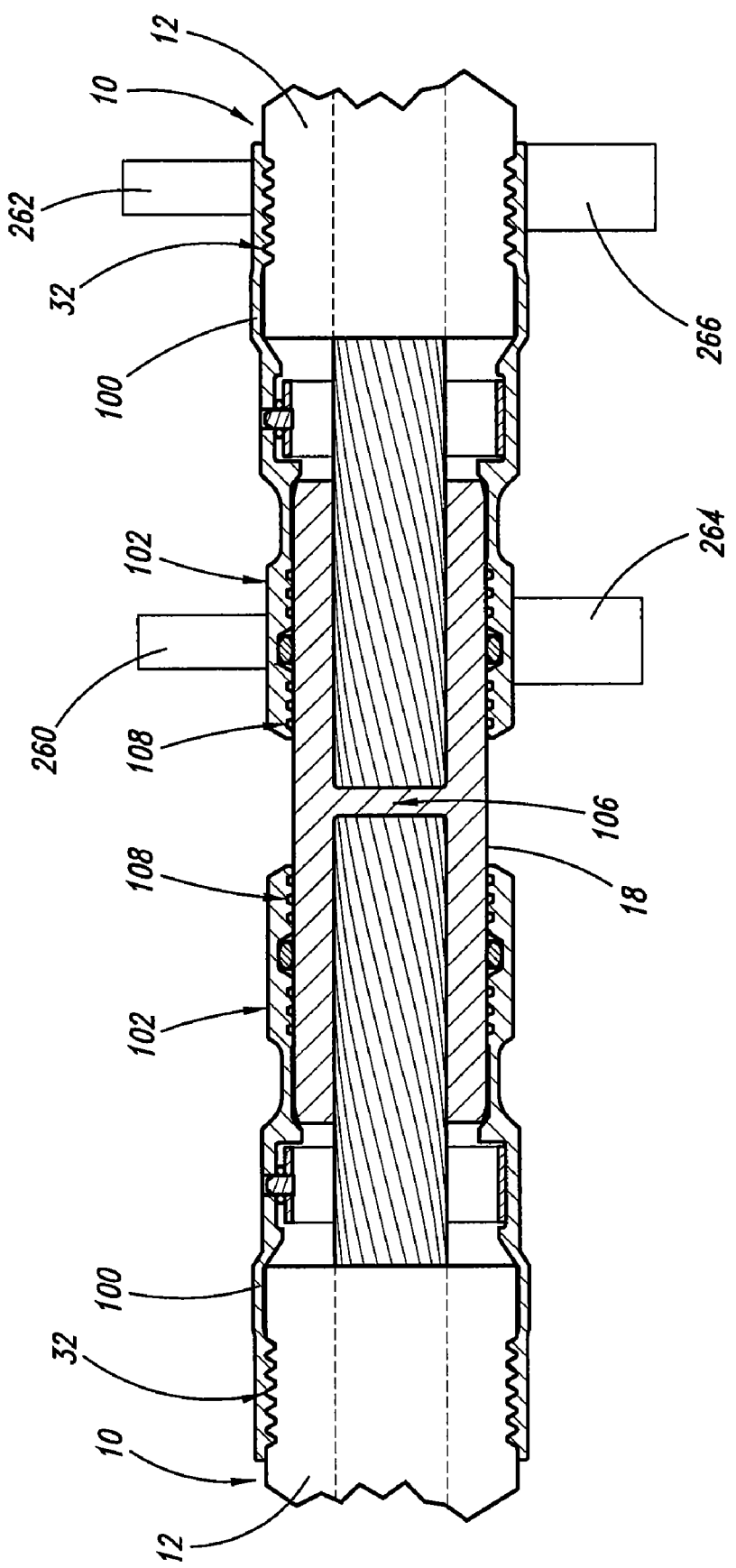
FIG. 13 is the swagable high-pressure, dual-housing splice connector of FIG. 8 showing the swaging of the housing to the splice crimp connector and to the insulation jacket.

Swaging can be performed in a single operation, as described above, or in phases (i.e. wherein splice crimp connector 18 is first swaged together with conductor 14 and then housing 100 is swaged with the splice crimp connector/conductor combination 18/14, provided that the length of the splice crimp connector and length of the housing can accommodate sliding housing 100 out of the way or in the unusual event that the splice crimp connector OD is greater than the insulation OD (e.g., as sometimes found in Japan). In either event, this swaging assures intimate mechanical, thermal and electrical union and contact between housing 100, splice crimp connector 18 and conductor 14; it also results in a fluid-tight seal between housing 100 and splice crimp connector 18. The housing 100 is shown in FIG. 13 being swaged by a swaging roller 260 at position 102 to the splice crimp connector 18, and by a swaging roller 262 over the portion with the machined teeth 32 to the insulation jacket 12.

When the splice according to the embodiment of FIG. 8 is to be used in a flow-through mode, water stop region 106 (i.e., a barrier wall within splice crimp connector 18) may be omitted or drilled out prior to assembly. To facilitate flow through the swaged conductor area at least one micro tube (not shown) of sufficiently high strength to avoid crushing during subsequent swaging and of sufficient length to allow fluidic communication between the annular spaces remaining at each end of the crimp connector 18 may be placed within the annulus formed between the two conductors 14 and the crimp connector 18 when the water stop region 106 is omitted. A swage is then applied to the exterior of housing 100 over machined teeth 32 such that teeth 32 deform insulation jacket 12 sufficiently to form a fluid tight seal and prevent pushback of the insulation when the cable segments are pressurized. The injection port 48 on housing 100 allows fluid to be injected or withdrawn at elevated pressures, as described above. Again, when the swagable high-pressure splice connector according to this embodiment is to be used in flow-through mode, the injection ports may be omitted.

In a somewhat different aspect, the high-pressure connector can be an axially-secured splice connector for joining a first electrical cable segment and a second like electrical cable segment, with each cable segment having a respective central conductor, optionally surrounded by a conductor shield (not shown), encased in a polymeric insulation jacket, each jacket having an end wall, and each segment having an interstitial void volume. The conductors are joined at an end of each segment by a splice crimp connector in electrical communication with each conductor. The swagable high-pressure splice connector is suited for introducing a fluid into the interstitial void volume of at least the first cable segment and confining the fluid therein at a residual pressure above atmospheric, but below the elastic limit of the polymeric insulation jacket. The axially-secured high-pressure splice connector includes a tubular housing positioned essentially in coaxial alignment with the cable segments and optionally has at least one injection port for introducing the fluid. The housing has an inner diameter sized to receive the splice crimp connector and the insulation jacket of the first and second cable segments therethrough. First and second face seals are attached to each respective end wall of the first and second insulation jackets with at least one fastener, such as a screw, and each face seal is additionally secured to the housing. First and second sealing bushings are positioned proximal to each respective face seal, with the face seals and the sealing bushings being capable of confining the fluid within the high-pressure splice connector and the interstitial void volume of at least one of the cable segments at the residual pressure.

A specific embodiment of an axially-secured high-pressure splice connector is illustrated in FIG. 9. The cable end preparations are the same as previously described and the rest of the assembly proceeds as follows. Again, this description is for one cable segment 10 and it is understood that the operation is duplicated for the other cable segment 10. The housing 110 is first slid to one side, as described above. Face seal 112 is slid over conductor 14 and at least one, preferably three, self-tapping screws 118 are inserted through holes 130 (see detail in FIG. 9A) in face seal 112 and tightened within optionally pre-drilled holes in the end wall of insulation jacket 12 until at least one axially-projecting circular face tooth 114 on face seal 112 is entirely embedded in the end wall of insulation jacket 12 to form a fluid-tight seal between the latter and face seal 112. As an alternative to the self-taping screws, holes can be pre-drilled axially in the insulation and, if necessary, tapped to accommodate matching machine screws. A sealing bushing 120 having axial O-ring 122 and circumferential O-ring 124, each O-ring residing in a respective groove in sealing bushing 120, is threadably mated on an axially inward projecting threaded collar portion 126 of the face seal 112. This ensures that O-ring 122 forms a fluid-tight seal between the face seal 112 and sealing bushing 120. The O-ring 124 forms a fluid-tight seal between the housing 110 and the face seal 112. The splice crimp connector 18 and bushing 22 are crimped to the conductor 14, again as described above with respect to FIG. 1. After all crimping is complete, the housing 110 is slid back and centered over the splice crimp connector 18. Face seal 112 is attached to housing 110 with screws 116 (pins or crimps are also contemplated for this purpose). This securing means is further illustrated in FIGS. 9A and 9B, wherein screws 116 are inserted through slots 132 in housing 110 and threadably mate with tapped orifices 128 in face seal 112.

In another variation, the high-pressure connector is a splice connector for joining a first electrical cable segment and a second like electrical cable segment, with each cable segment having a central stranded conductor, optionally surrounded by a conductor shield, encased in a polymeric insulation jacket and having an interstitial void volume. The conductors are joined at an end of each segment by a splice crimp connector in electrical communication with each conductor. The high-pressure splice connector is suited for introducing a fluid into the interstitial void volume of each cable segment and confining the fluid therein at a residual pressure above atmospheric, but below the elastic limit of the polymeric insulation jacket. The high-pressure splice connector includes a first hollow housing having an interior wall which defines a first interior chamber adapted to be in fluid communication with the interstitial void volume of the first cable segment and optionally having at least one injection port for introducing said fluid into the first chamber. The first housing interior wall is sized to receive the splice crimp connector and the insulation jacket of the first cable segment within the first chamber and positioned to surround and axially overlap at least a portion of the splice crimp connector and at least a portion of the insulation jacket of the first cable segment. A first seal is positioned between the insulation jacket of the first cable segment and the interior wall of the first housing, and a second seal is positioned between the splice crimp connector and the interior wall of the first housing. The first and second seals are capable of confining the fluid at the residual pressure within the first chamber and the interstitial void volume of the first cable segment. A second hollow housing has an interior wall which defines a second interior chamber in fluid communication with the interstitial void volume of the second cable segment and optionally has at least one injection port for introducing the fluid into the second chamber. The second housing interior wall is sized to receive the splice crimp connector and the insulation jacket of the second cable segment within the second chamber and is positioned to surround and axially overlap at least a portion of the insulation jacket of the second cable segment. The second housing is secured to, and is in fluid-tight union with, the first housing. A third seal is positioned between the insulation jacket of the second cable segment and the interior wall of the second housing, and is capable of confining the fluid at the residual pressure within the second chamber and the interstitial void volume of the second cable segment. First and second securing members are positioned proximal to the outward end portions of the first and second housings and attached to the first and second housing, respectively, and adjacent to the first and third seals. Each securing member has an aperture sized to receive the respective insulation jacket therethrough and has a grasping portion with at least one adjustably movable gripping member. The gripping member protrudes inwardly into the aperture sufficiently to inwardly deformingly engage a portion of the respective insulation jacket with sufficient force when moved into engagement therewith to essentially immobilize the cable segment end with respect to the high-pressure splice connector during the introduction of the fluid and while the fluid is confined at the residual pressure.

In another variation, the instant connector is similar to the immediately preceding high-pressure splice connector and is a high-pressure terminal connector for an electrical cable segment having a central stranded conductor encased in a polymeric insulation jacket. The conductor has a termination crimp connector attached to one end of the conductor and in electrical communication therewith, and the cable segment has an interstitial void volume. The connector is suited for introducing a fluid into the interstitial void volume and confining the fluid therein at a residual pressure above atmospheric, but below the elastic limit of the polymeric insulation jacket. The high-pressure terminal connector includes a hollow housing having an interior wall which defines an interior chamber in fluid communication with the interstitial void volume of the cable segment and optionally having at least one injection port for introducing the fluid into the interior chamber. The housing interior wall is sized to receive the termination crimp connector and the insulation jacket within the interior chamber and positioned to surround and axially overlap at least a portion of the termination crimp connector at an end thereof and at least a portion of the insulation jacket at an end thereof with the cable segment extending from an end portion of the housing. The housing is secured to the termination crimp connector and in electrical communication therewith. A first seal is positioned between the termination crimp connector and the interior wall of the housing, and a second seal is positioned between the insulation jacket and the interior wall of the housing. The first and second seals are capable of confining the fluid at the residual pressure within the interior chamber of the housing and the interstitial void volume. A securing member is positioned proximal to the end portion of the housing and attached thereto. The securing member has an aperture sized to receive the insulation jacket therethrough and has a grasping portion having at least one inwardly, adjustably movable gripping member. The gripping member protrudes inwardly into the aperture sufficiently to contact and inwardly, deformingly engage a contacted portion of the insulation jacket with sufficient force when moved inwardly into engagement therewith to immobilize the high-pressure terminal connector with respect to the cable segment during the introduction of the fluid into the injection port and while the fluid is confined by the high-pressure terminal connector at the residual pressure.

Figure 10:
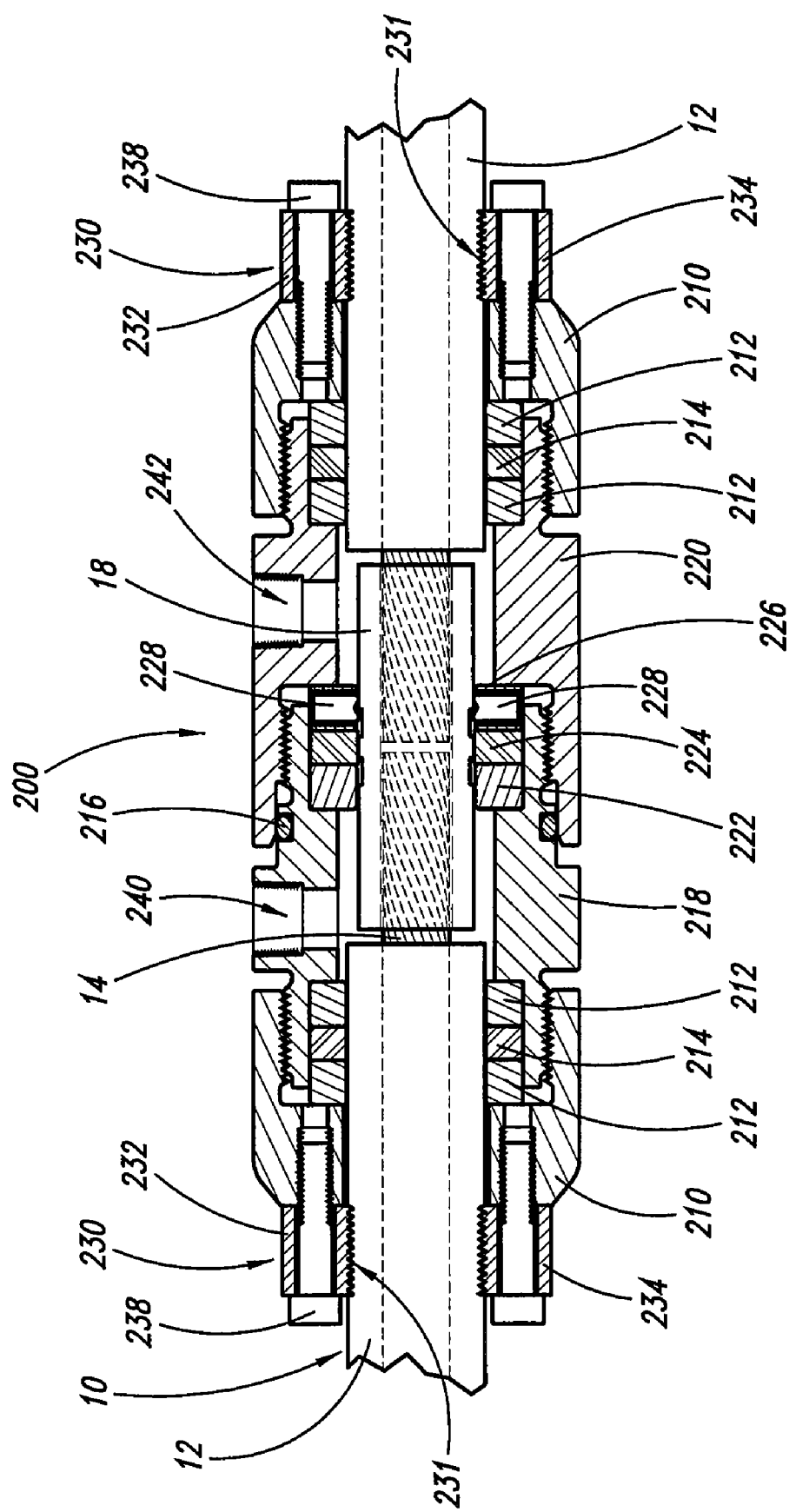
FIG. 10 is a partial cross-sectional view of a high-pressure splice connector having compression seals and secured with a clamping collar.

In a typical assembly procedure and use of a specific embodiment of the above high-pressure splice connector 200 employing compression seals, illustrated in FIG. 10, each cable segment 10 is first prepared as described above. A first internally threaded cap 210 is installed over insulation jacket 12 of the left side cable segment 10 of FIG. 10 followed by a first metal washer 212, a rubber washer 214 and a second metal washer 212. Rubber O-ring 216 is installed in a groove of threaded hollow housing 218. Externally threaded hollow housing 218 is then loosely threaded onto the already installed first threaded cap 210 to position the first metal washer 212, rubber washer 214 and second metal washer 212 therein with the insulation jacket 12 of the left-side cable segment 10 extending through them. The left side cap/housing sub-assembly 210/218 is slid out of the way to the left.

Likewise, a second internally threaded cap 210 is installed over insulation jacket 12 of the right side cable segment 10 followed by a first metal washer 212, a rubber washer 213 and a second metal washer 212. Threaded hollow housing 220 is then loosely threaded onto the already installed second threaded cap 210 to position the first metal washer 212, rubber washer 214 and second metal washer 212 therein with the insulation jacket 12 of the right-side cable segment 10 extending through them. The right side cap/sub-assembly 210/220 is slid out of the way to the right. It should be apparent to those skilled in the art that the orientation of sub-assemblies 210/218 and 210/220 could be reversed in the above description with no impact on performance of the high-pressure splice connector.

Figure 10A:
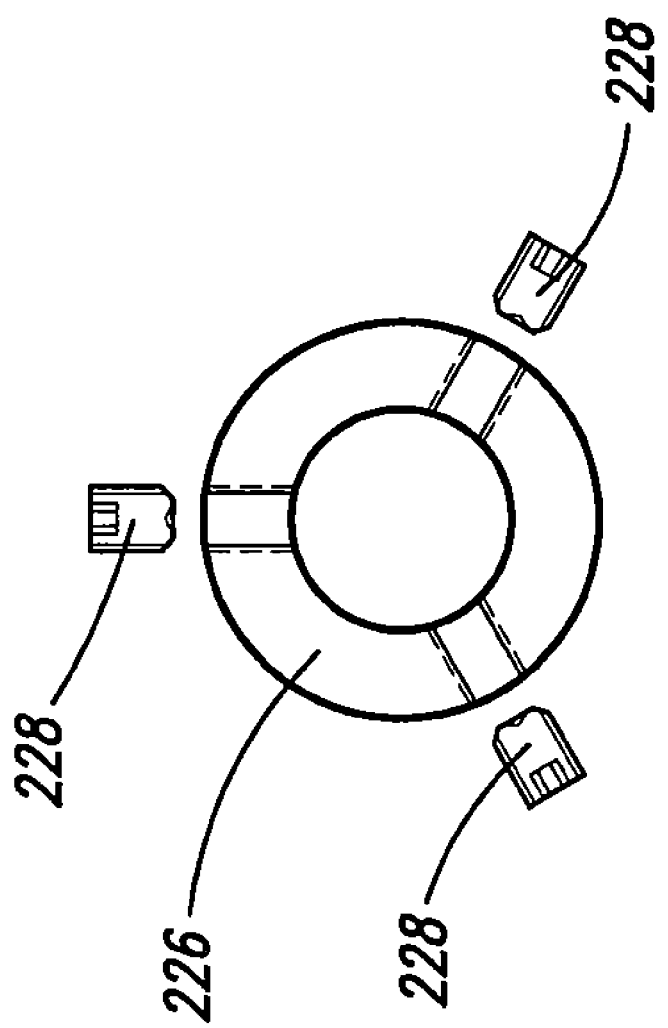
FIG. 10A is a plan view of the central washer of FIG. 10 showing associated set screws.

A first metal washer 222, a rubber washer 224, and a second metal washer 226, with associated radial set screws 228, are next slid over splice crimp connector 18 before the latter is slid over the exposed conductors 14 of the right and left sides and crimped or otherwise permanently attached to the conductors 14 on both the right and left cables 12. The washers 222, 224 and 226 may slid to the left or the right to facilitate crimping of the crimp connector. Washers 222, 224 and 226 are positioned together such that rubber washer 224 is directly over the central un-crimped portion of splice crimp connector 18. At least one and preferably at least three set screws 228 radially disposed on washer 226 (see FIG. 10A) are tightened to make a mechanical and electrical connection with splice crimp connector 18 such that washer 226 is immobilized with respect to the latter. The two cap/housing subassemblies 210/218 and 210/220 are slid together and centered over splice crimp connector 18 and then threaded together to apply an axial force sufficient to deform washer 224 to provide a fluid-tight seal at the inner and outer circumferences thereof. Likewise, each cap/housing subassembly 210/218 (left) and 210/220 (right) is threaded together tightly such that the axial force applied is sufficient to radially deform each rubber washer 214 to seal against the insulation jacket 12 of the respective cable segment 10 extending therethrough as well as against the interior wall of the respective threaded hollow housing (218 and 220) within which the cable segment is positioned.

Figure 10B:
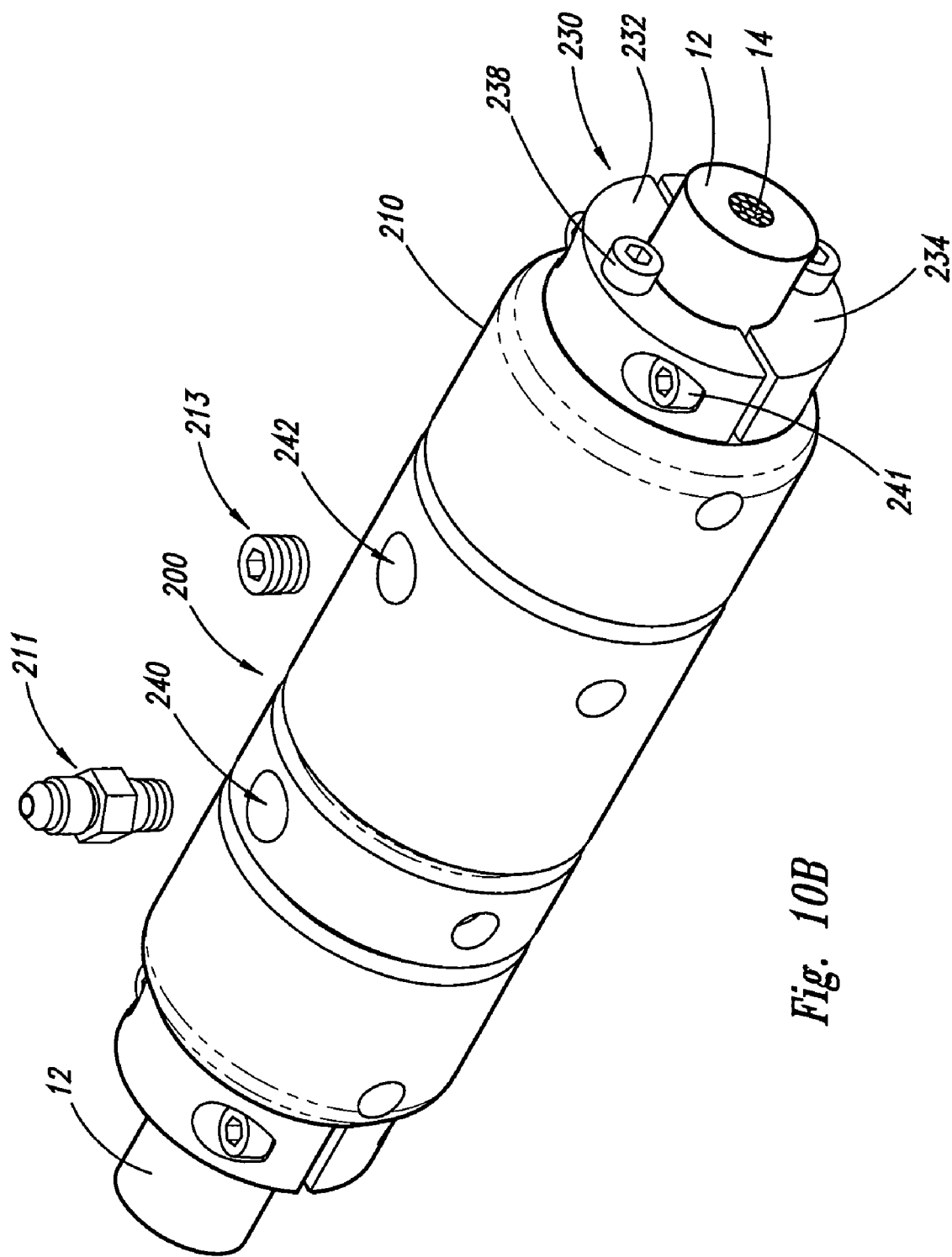
FIG. 10B is a perspective view of the high-pressure splice connector of FIG. 10.

A securing member, in the form of a split ring clamping collar 230, is placed at the outer end of each of the threaded caps 210 and as close thereto as possible, as shown in FIG. 10. Each collar 230 is made up of split ring halves 232 and 234, further illustrated in perspective detail in FIG. 10B. In turn, each half 232 and 234 incorporate course internal threads 231 for engaging and grasping insulation jacket 12. Two clamping collar chord bolts 241 are screwed tightly into place to securely join the halves 232 and 234 of clamping collar 230, again as shown in FIG. 10B, causing the course threads 231 disposed at the inner diameter of collar 230 to at least partially penetrate or deform the surface of insulation jacket 12 and thereby anchor collar 230 thereto. A hose clamp (not shown) can be used to hold the two halves of collar 230 temporarily in place during this procedure. Two clamping collar bolts 238 are then inserted and tightly threaded into aligned respective tapped holes in each cap 210, thereby providing resistance to axial movement of the high-pressure splice connector 200 relative to insulation jackets 12 when the respective cable segment is pressurized. It is also contemplated herein that similarly serrated or otherwise inwardly projecting gripping surfaces can be substituted for the course threads 231 and the skilled artisan will readily recognize many structural equivalents therefor.

Fluid at a predetermined pressure is then injected through one or more fittings 231 mounted at injection port 240 and/or 242 of the housings 218 and 220 which, e.g., may be tapped to accept a threaded fitting. A single fitting 231 is shown positioned for threaded insertion in port 240 in FIG. 10B. Such fittings can be selected from those well known in the art, including NPT pipe fittings and quick-disconnect couplings. Any unused tapped injection port can be plugged with a threaded plug. A plug 213 is shown positioned for threaded insertion in port 242 in FIG. 10B. It is preferred that miniaturized versions of conventional quick-disconnect couplings are used and that these fit essentially flush with the outer surface of the corresponding housing 218, 220 to provide a protrusion-free or low profile outer surface for the high-pressure splice connector to readily receive subsequent insulation component(s) and avoid any sharp electrical stress concentration points. With such a coupling, the pressurized fluid supply can be readily disconnected and the injected fluid trapped within the interstitial void volume of the cable at a residual pressure P throughout the entire length of the cable segment being treated. Alternatively, the above described self-actuated spring valves can be used in these high-pressure connectors that employ such compression seals.

It is again contemplated that each cable segment of the above splice connecter can be injected with pressurized fluid using different start times and/or different pressures. Although less preferred, it is also possible to inject both cable segments simultaneously or in flow-through mode and, in these cases, rubber washer 224 is generally omitted or other accommodations are made to facilitate flow. At least one metal washer 222 and 226 may be retained in this case to assure that the metal of the high-pressure splice connector 200 is in thermal and electrical communication with splice crimp connector 18. Furthermore, with proper cable preparation, it is contemplated that the two housings 218 and 220 can be replaced with a single housing in the case where rubber washer 224 is omitted while metal washer 222 and/or 226 may remain to provide electrical and thermal contact with the housing.

Figure 11:
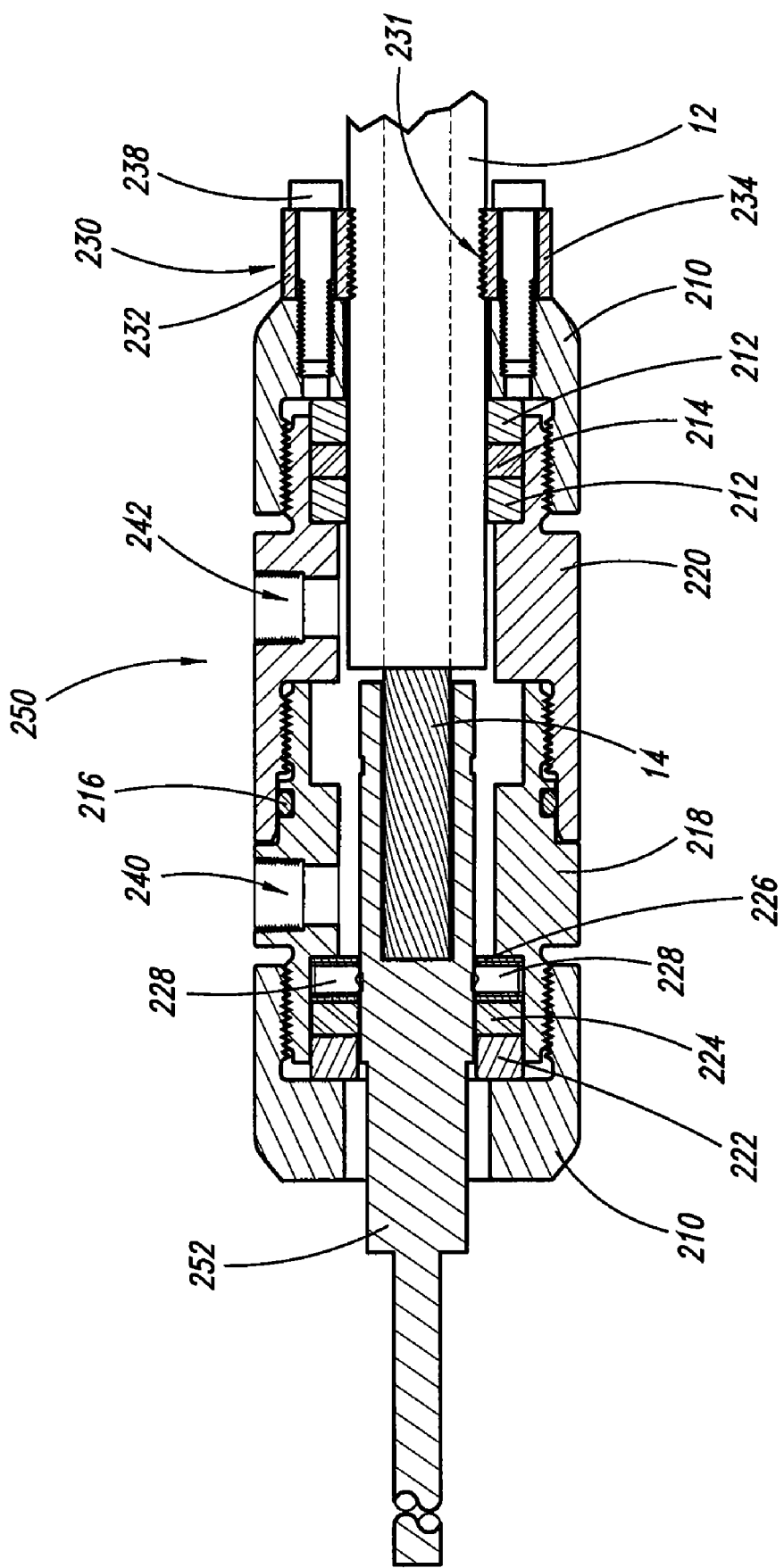
FIG. 11 is a partial cross-sectional view of a high-pressure terminal connector having compression seals and secured with a clamping collar.

A specific embodiment of a high-pressure terminal connector 250, which employs the same compression seals and clamp securing means as those recited for the high-pressure splice connector of FIG. 10, is illustrated in FIG. 11, wherein the components have identical reference numbers but the left side cable segment and the splice crimp connector 18 are replaced with termination crimp connector 252. Fluid at a predetermined pressure is injected through at least one threaded injection port 240 or 242 using appropriate fittings, as described above.

Figure 12:
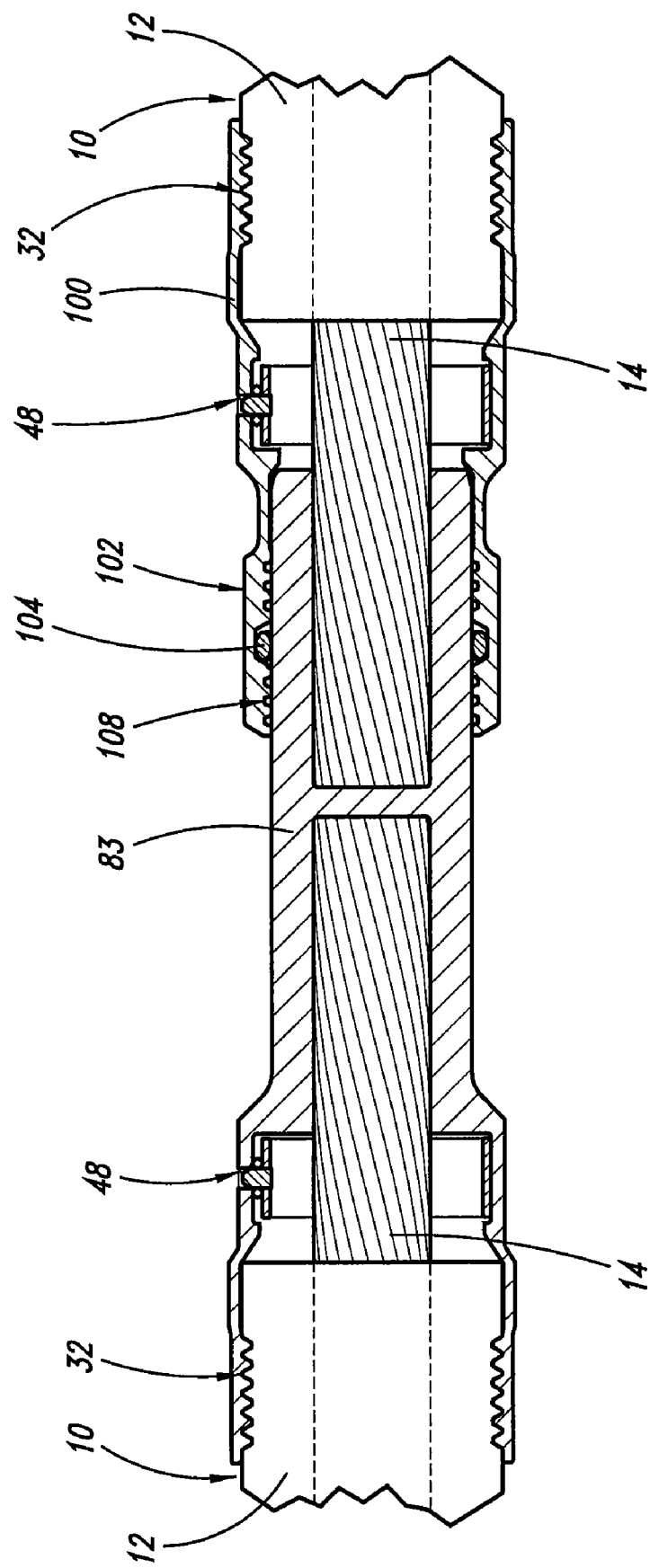
FIG. 12 is a partial cross-sectional view of a swagable high-pressure splice connector which combines the sealing and securing means shown in FIG. 6 and FIG. 8.

As will be apparent to those skilled in the art, the high-pressure splice connectors described herein are generally symmetrical with respect to a plane perpendicular to the cable axis and through the center of the splice crimp connector, and the assembly procedures described are generally applied to both ends of the splice. It also will be recognized that various combinations of the sealing and crimping options described herein for the different embodiments may be combined in "mix-and-match" fashion to provide the intended sealing and securing functions, although the skilled artisan will readily determine the more desirable and/or logical combinations. For example, FIG. 12 illustrates a dual housing high-pressure splice connector formed by combining the integral swagable high-pressure terminal connector of FIG. 6 and one of the housings of the dual housing, swagable high-pressure splice connector of FIG. 8. In this case, the integral housing/termination crimp connector 80 of FIG. 6 has been slightly modified to form the new integral housing/splice crimp connector 83 of FIG. 12.

In general, the components of the instant connectors, except for any rubber (elastomeric) washers or rubber O-rings employed, are designed to withstand the anticipated pressures and temperatures and may be fabricated from a metal such as aluminum, aluminum alloy, copper, or stainless steel. It is also possible to employ non-conductive components if the high-pressure terminal or splice connector design accommodates electrical communication between the associated termination crimp connector or splice crimp connector (i.e., with the conductor in each case) and any subsequently applied conductive insert. That is, the semiconductor portion of any splice body applied over the high-pressure terminal connector or splice connector, as conventionally practiced in the art, should be essentially at the same potential as the conductor. Preferably, thick aluminum or copper washers, in conjunction with rubber washers are used in connectors employing compression seals, as illustrated in FIGS. 10 and 11. Since these metals exhibit high thermal conductivities, they facilitate dissipation of heat in the load-carrying termination or splice, thereby reducing the temperature at the surface of the insulation jacket proximal to the respective connector. This result can also be achieved by fabricating the cable-side housing (e.g., housing 220 of FIG. 11 from a plastic or ceramic having the appropriate mechanical strength and durability, such as fiber-reinforced epoxy or graphite. This again allows the insulation enclosed by the plastic housing to remain cooler than in the case of a metallic housing, thereby better maintaining the good physical properties of the insulation polymer. Rubber washers and O-rings may be formed from any suitable elastomer compatible with the fluid(s) contemplated for injection as well as the maximum operating temperature of the connector. Preferred rubbers include fluorocarbon rubbers, ethylene-propylene rubbers, urethane rubbers and chlorinated polyolefins, the ultimate selection being a function of the solubility of, and chemical compatibility with, the fluid(s) used so as to minimize swell or degradation of any rubber component present.

While not often encountered, transition splices, which join two different sizes of cables, or even two different types of cables, may be joined and injected using the high-pressure splice connectors described herein. It is contemplated that any high-pressure splice or dead-front terminal connector described herein provides for electrical contact between the respective splice crimp connector or dead-front termination crimp connector and the corresponding conductive insert, as commonly practiced in the art, in order to prevent electrical discharges or corona. Of course, live-front devices, which do not employ conductive inserts, have no requirements to maintain electrical contact with a non-existent conductive insert, but still have requirements for stress relief and anti-tracking surfaces which are well known in the art. In addition, it is preferred that there be good thermal contact between the conductor and the housing (e.g., using set screws, crimping) to provide for heat dissipation away from the conductor.

Although only high-pressure terminal and splice connectors have been recited, it should be appreciated that the instant high-pressure connectors can also be used in tandem to form Y, T, or H electrical joints. Thus, for example, one of the high-pressure terminal connectors described above can be applied to each of three cable segments. Appropriately designed termination crimp connectors used for this purpose can be plugged into the three respective terminals of a Y or T joint, such as those commercially available from Elastimold or Richards Manufacturing Co., and each segment separately injected with fluid, as desired. It should also be understood that the "like" cable segments described above in connection with the high-pressure splice connector embodiments include cable segments that are not strictly identical but may be electrically connected with a joint or a transition joint, both of which are well know in the art.

EXAMPLES

An electric distribution cable (⅙, 15 kV, 100%, concentric; 107 feet in length) was coiled and immersed in a water bath at 30° C. The ends of the cable were each prepared with a nominal ⅛" to ¼" gap between crimped pin terminators and the insulation jacket cut-back to accommodate the flow of fluid into the cable stands. A terminal connector, as shown in FIG. 11, but with collar 230 omitted, was installed over each cable end. The cable was filled with acetophenone at a uniform pressure of 30 psig and maintained for seven days. On the seventh day, the pressure was uniformly increased and held at approximately 60 psig. On the eleventh day of the experiment the pressure was uniformly increased to 120 psig. A leak was detected and depressurization was observed on the twelfth day of the experiment and after 27.5 hours at 120 psig. The leak was caused by pushback of the insulation jacket at one end past the seal at the cable-side of the terminal connector. The amount of pushback during this event was between 0.375 and 0.500 inch at the leaking end.

The termination crimp connector at the leaking end was replaced with a new unit and the experiment was resumed at 120 psig. The pressure was increased to 240 psig on the 14$^{th}$ day. On day 17, three days after the pressure was increased to 240 and four days after the pressure was resumed at 120 psig, the above terminal connector again experienced pushback in the 0.375 to 0.500 inch range and leakage. Both termination crimp connectors were again replaced and the above procedure was followed wherein the pressure was resumed at 240 psig and maintained for one week from day 18 to day 25. On day 25 the pressure was being increased to a targeted 480 psig when pushback again caused a leak at 430 psig. The total time above 240 psig was about 7 minutes and the amount of pushback was 1.42 inches and 0.45 inch at the two ends of the cable segment, respectively. The terminal connectors could tolerate approximately 1.08 inches of pushback in this particular configuration before such a gap reached the first end of the elastomeric seal, but the pushback phenomenon would likely continue if longer times and/or greater pressures were employed.

The above terminal connectors were modified with a clamping collar 230, as disclosed herein and shown in FIG. 11, and the insulation-clamp interface was marked to indicate pushback. This cable segment was then pressurized to 480 psig for 41 hours, and four hours at 600 psig. The terminations did not leak and there was no observable movement of the mark. Upon disassembly, pushback was essentially zero. Additional experiments using the high-pressure terminal connectors according to FIG. 11 at 240 psig and 480 psig were carried out wherein the pressure was allowed to decay due to diffusion of the acetophenone through the insulation jacket over a period of 9 and 156 days, respectively. No measurable pushback or leak was detected.

From the foregoing it will be appreciated that, although specific embodiments of the invention have been described herein for purposes of illustration, various modifications may be made without deviating from the spirit and scope of the invention.

Accordingly, the invention is not limited except as by the appended claims.

The invention claimed is:

1. A high-pressure connector for an electrical power cable segment having a central stranded conductor encased in a polymeric insulation jacket and having an interstitial void volume in the region of the stranded conductor, the high-pressure connector being suited for confining a fluid within the interstitial void volume at a residual pressure above atmospheric, but below the elastic limit of the polymeric insulation jacket, the high-pressure connector comprising:

a housing having a wall defining an interior chamber configured to be in fluid communication with the interstitial void volume, the housing having an end portion with the housing wall thereof sized to receive the insulation jacket within the housing interior chamber and to overlap at least a portion of the insulation jacket at an end thereof with the cable segment extending from the housing end portion and at least a portion of the stranded conductor positioned within the housing interior chamber; and attachment means for sealing the insulation jacket with respect to the housing wall and confining the fluid at the residual pressure within the housing interior chamber and the interstitial void volume, and for sufficiently securing the cable segment to the housing to prevent pushback of the insulation jacket at the residual pressure, wherein the attachment means includes inwardly projecting engagement members attached to the housing wall and configured to deform and partially penetrate the insulation jacket along the periphery thereof to secure the housing wall to the insulation jacket.

2. The connector of claim 1 further including a conductor member configured to be secured to the housing and in fluid-tight sealed engagement therewith, and to be secured to the stranded conductor and in electrical contact therewith.

3. The connector of claim 2 wherein the conductor member is configured to be positioned within the housing interior chamber.

4. The connector of claim 3 wherein the conductor member has a wall defining an interior member chamber with an open end, the interior member chamber being sized to receive the stranded conductor therein and the member wall being of a deformable material to secure the conductor member to the stranded conductor in electrical contact therewith upon inward deformation of the member wall against the stranded conductor.

5. The connector of claim 2 wherein the housing and the conductor member are a unitary member.

6. The connector of claim 5 wherein the conductor member has a wall defining an interior member chamber with an open end, the interior member chamber being sized to receive the stranded conductor therein and the member wall being of a deformable material to secure the conductor member to the stranded conductor in electrical contact therewith upon inward deformation of the member wall against the stranded conductor.

7. The connector of claim 1 further including a conductor member configured to be secured to the housing, and to be secured to the stranded conductor and in electrical contact therewith.

8. The connector of claim 7 wherein the conductor member is configured to be positioned within the housing interior chamber.

9. The connector of claim 8 wherein the conductor member has a wall defining an interior member chamber with an open end, the interior member chamber being sized to receive the stranded conductor therein and the member wall being of a deformable material to secure the conductor member to the stranded conductor in electrical contact therewith upon inward deformation of the member wall against the stranded conductor.

10. The connector of claim 1 further including a conductor member and a bushing member, the conductor member being configured to be positioned within the housing interior chamber and to be secured to the stranded conductor and in electrical contact therewith, the bushing member being configured to be positioned within the housing interior in electrical contact with the conductor member and the housing, and having an aperture sized to receive the conductor member therein.

11. The connector of claim 10 wherein the bushing member is configured to be secured to the housing and the conductor member.

12. A high-pressure connector for an electrical power cable segment having a central stranded conductor encased in a polymeric insulation jacket and having an interstitial void volume in the region of the stranded conductor, the high-pressure connector being suited for confining a fluid within the interstitial void volume at a residual pressure above atmospheric, but below the elastic limit of the polymeric insulation jacket, the high-pressure connector comprising:

a housing having a wall defining an interior chamber configured to be in fluid communication with the interstitial void volume, the housing having an end portion with the housing wall thereof sized to receive the insulation jacket within the housing interior chamber and to overlap at least a portion of the insulation jacket at an end thereof with the cable segment extending from the housing end portion and at least a portion of the stranded conductor positioned within the housing interior chamber;

attachment means for sealing the insulation jacket with respect to the housing wall and confining the fluid at the residual pressure within the housing interior chamber and the interstitial void volume, and for sufficiently securing the cable segment to the housing to prevent pushback of the insulation jacket at the residual pressure; and a conductor member and a bushing member, the conductor member being configured to be positioned within the housing interior chamber and to be secured to the stranded conductor and in electrical contact therewith, the bushing member being configured to be positioned within the housing interior in electrical contact with the conductor member therein, the bushing member being configured to be secured to the housing and the conductor member, wherein the bushing member includes a bushing indent and the housing wall has a deformable portion positioned adjacent to the bushing indent, the deformable portion being inwardly deformable into the bushing indent to secure the bushing against movement with respect to the housing.

13. A high-pressure connector for an electric power cable segment having a central stranded conductor encased in a polymeric insulation jacket and having an interstitial void volume in the region of the stranded conductor, the high-pressure connector being suited for confining a fluid within the interstitial void volume at a residual pressure above atmospheric, but below the elastic limit of the polymeric insulation jacket, the high-pressure connector comprising:

a housing having a wall defining an interior chamber configured to be in fluid communication with the interstitial void volume, the housing having an end portion with the housing wall thereof sized to receive the insulation jacket within the housing interior chamber and to overlap at least a portion of the insulation jacket at an end thereof with the cable segment extending from the housing end portion and at least a portion of the stranded conductor positioned within the housing interior chamber;

attachment means for sealing the insulation jacket with respect to the housing wall and confining the fluid at the residual pressure within the housing interior chamber and the interstitial void volume, and for sufficiently securing the cable segment to the housing to prevent pushback of the insulation jacket at the residual pressure; and a conductor member and a bushing member, the conductor member being configured to be positioned within the housing interior chamber and to be secured to the stranded conductor and in electrical contact therewith, the bushing member being configured to be positioned within the housing interior in electrical contact with the conductor member and the housing, and having an aperture sized to receive the conductor member therein, the bushing member being configured to be secured to the housing and the conductor member, wherein the bushing has a deformable portion configured to extend about the conductor member in a position adjacent to the conductor member, the deformable portion being inwardly deformable against the conductor member to secure the bushing against movement with respect to the conductor member.

14. A high-pressure connector for an electric power cable segment having a central stranded conductor encased in a polymeric insulation jacket and having an interstitial void volume in the region of the stranded conductor, the high-pressure connector being suited for confining a fluid within the interstitial void volume at a residual pressure above atmospheric, but below elastic limit of the polymeric insulation jacket, the high-pressure connector comprising:

a housing having a wall defining an interior chamber configured to be in fluid communication with the interstitial void volume, the housing having an end portion with the housing wall thereof sized to receive the insulation jacket within the housing interior chamber and to overlap at least a portion of the insulation jacket at an end thereof with the cable segment extending from the housing end portion and at least a portion of the stranded conductor positioned within the housing interior chamber;

attachment means for sealing the insulation jacket with respect to the housing wall and confining the fluid at the residual pressure within the housing interior chamber and the interstitial void volume, and for sufficiently securing the cable segment to the housing to prevent pushback of the insulation jacket at the residual pressure; and a conductor member and a bushing member, the conductor member being configured to be positioned within the housing interior chamber and to be secured to the stranded conductor and in electrical contact therewith, the bushing member being configured to be positioned within the housing interior in electrical contact with the conductor member and the housing, and having an aperture sized to receive the conductor member therein, the bushing member being configured to be secured to the housing and the conductor member, further including a first seal positionable between the bushing member and the housing, and a second seal positionable between the bushing member and the conductor member to provide fluid-tight sealed engagement therewith.

15. A high-pressure connector for connecting together first and second electrical power cable segments, the first cable segment having a first central stranded conductor encased in a first polymeric insulation jacket and having a first interstitial void volume in the region of the first stranded conductor, the high-pressure connector being suited for confining a first fluid within the first interstitial void volume at a first residual pressure above atmospheric, but below the elastic limit of the first polymeric insulation jacket, and the second cable segment having a second central stranded conductor encased in a second polymeric insulation jacket and having a second interstitial void volume in the region of the second stranded conductor, the high-pressure connector being suited for confining a second fluid within the second interstitial void volume at a second residual pressure above atmospheric, but below the elastic limit of the second polymeric insulation jacket, the high-pressure connector comprising:

a housing having a wall defining first and second interior chambers, the housing first interior chamber being configured to be in fluid communication with the first interstitial void volume, the housing having a first end portion with the housing wall thereof sized to receive the first insulation jacket of the first cable segment within the housing first interior chamber and to overlap at least a portion of the first insulation jacket at an end thereof with the first cable segment extending from the housing first end portion and at least a portion of the first stranded conductor of the first cable segment positioned within the housing first interior chamber, and the housing second interior chamber being configured to be in fluid communication with the second interstitial void volume, the housing having a second end portion with the housing wall thereof sized to receive the second insulation jacket of the second cable segment within the housing second interior chamber and to overlap at least a portion of the second insulation jacket at an end thereof with the second cable segment extending from the housing second end portion and at least a portion of the second stranded conductor of the second cable segment positioned within the housing second interior chamber, wherein a first portion of the housing wall of the first end portion of the housing is comprised of a swagable material and a second portion of the housing wall of the second end portion of the housing is comprised of a swagable material;

a first seal configured to seal the first insulation jacket with respect to the housing wall at the first end portion of the housing to confine the first fluid at the first residual pressure within the housing first interior chamber and the first interstitial void volume;

a second seal configured to seal the second insulation jacket with respect to the housing wall at the second end portion of the housing to confine the second fluid at the second residual pressure within the housing second interior chamber and the second interstitial void volume;

a first securing member configured to secure the first cable segment to the housing at the first end portion of the housing, the first securing member being capable of preventing pushback of the first insulation jacket at the first residual pressure, the first securing member including inwardly projecting engagement members attached to the first portion of the housing wall of the first end portion of the housing and configured to deform and partially penetrate the first insulation jacket along a periphery thereof upon inward swaging of the first portion of the housing wall of the first end portion of the housing; and a second securing member configured to secure the second cable segment to the housing at the second end portion of the housing, the second securing member being capable of preventing pushback of the second insulation jacket at the second residual pressure, the second securing member including inwardly projecting engagement members attached to the second portion of the housing wall of the second end portion of the housing and configured to deform and partially penetrate the second insulation jacket along a periphery thereof upon inward swaging of the second portion of the housing wall of the second end portion of the housing.

16. A high-pressure connector for an electrical power cable segment having a central stranded conductor encased in a polymeric insulation jacket and having an interstitial void volume in the region of the stranded conductor, the high-pressure connector being suited for confining a fluid within the interstitial void volume at a residual pressure above atmospheric, but below the elastic limit of the polymeric insulation jacket, the high-pressure connector comprising:

a housing having a wall defining an interior chamber configured to be in fluid communication with the interstitial void volume, the housing having an end portion with the housing wall thereof sized to receive the insulation jacket within the housing interior chamber and to overlap at least a portion of the insulation jacket at an end thereof with the cable segment extending from the housing end portion and at least a portion of the stranded conductor positioned within the housing interior chamber; and attachment means for sealing the insulation jacket with respect to the housing wall and confining the fluid at the residual pressure within the housing interior chamber and the interstitial void volume, and for sufficiently securing the cable segment to the housing to prevent pushback of the insulation jacket at the residual pressure, wherein the attachment means includes a deformable portion of the housing wall of the housing end portion, the deformable portion being of a deformable material such that upon inward deformation of the deformable portion against the insulation jacket a fluid-tight engagement is produced between the deformable portion and the insulation jacket.

17. The connector of claim 16 wherein the deformable material is swagable such that inward deformation by swaging of the deformable portion against the insulation jacket produces the fluid-tight engagement between the swaged deformable portion and the insulation jacket.

18. A high-pressure connector for an electrical power cable segment having a central stranded conductor encased in a polymeric insulation jacket and having an interstitial void volume in the region of the stranded conductor, the high-pressure connector being suited for confining a fluid within the interstitial void volume at a residual pressure above atmospheric, but below the elastic limit of the polymeric insulation jacket, the high-pressure connector comprising:

a housing having a wall defining an interior chamber configured to be in fluid communication with the interstitial void volume, the housing having an end portion with the housing wall thereof sized to receive the insulation jacket within the housing interior chamber and to overlap at least a portion of the insulation jacket at an end thereof with the cable segment extending from the housing end portion and at least a portion of the stranded conductor positioned within the housing interior chamber; and attachment means for sealing the insulation jacket with respect to the housing wall and confining the fluid at the residual pressure within the housing interior chamber and the interstitial void volume, and for sufficiently securing the cable segment to the housing to prevent pushback of the insulation jacket at the residual pressure, wherein the attachment means includes inwardly projecting engagement members configured to deform and partially penetrate the insulation jacket along a periphery thereof, the engagement members being attached to a deformable portion of the housing wall of the housing end portion comprised of a deformable material, the attachment means being configured such that upon inward deformation of the deformable portion against the insulation jacket the engagement members are moved inward to deform and partially penetrate the insulation jacket along the periphery thereof to at least partially secure the housing wall to the insulation jacket in fluid-tight sealed engagement therewith.

19. The connector of claim 1 wherein the housing has a ported portion with at least one injection port in fluid communication with the housing interior chamber to introduce the fluid into the housing interior chamber.

20. A high-pressure connector for an electrical power cable segment having a central stranded conductor encased in a polymeric insulation jacket and having an interstitial void volume in the region of the stranded conductor, the high-pressure connector being suited for confining a fluid within the interstitial void volume at a residual pressure above atmospheric, but below the elastic limit of the polymeric insulation jacket, and being usable with an injection member, the high-pressure connector comprising:

a housing having a wall defining an interior chamber configured to be in fluid communication with the interstitial void volume, the housing having an end portion with the housing wall thereof sized to receive the insulation jacket within the housing interior chamber and to at least a portion of the insulation jacket at an end thereof with the cable segment extending from the housing end portion and at least a portion of the stranded conductor positioned within the housing interior chamber, the housing having a ported portion with at least one injection port in fluid communication with the housing interior chamber to introduce the fluid into the housing interior chamber;

attachment means for sealing the insulation jacket with respect to the housing wall and confining the fluid at the residual pressure within the housing interior chamber and the interstitial void volume, and for sufficiently securing the cable segment to the housing to prevent pushback of the insulation jacket at the residual pressure; and a self-closing valve positioned within the housing interior chamber at the injection port, the valve having a C-shaped spring in co-axial alignment with the housing ported portion and a seal positioned between the C-shaped spring and the housing ported portion and extending about the injection port, the C-shape spring being resiliently movable between a closed position and an open position, the C-shaped spring holding the seal against the housing ported portion to provide a fluid-tight seal between the housing and the C-shaped spring when the C-shaped spring is in the closed position, the C-shape spring being resiliently movable inward toward the open position upon insertion of the injection member through the injection port and into inward engagement with the C-shape spring.

21. The connector of claim 20 wherein the valve further includes a plug-pin carried by the C-shaped spring, the plug-pin being positioned to extend through the seal and toward the injection port, the plug-pin having an end face facing the injection port positioned for contact by the injection member.

22. The connector of claim 21 wherein the plug-pin projects into the injection port when the C-shaped spring is in the closed position.

23. The connector of claim 21 for use with the injection member having an end face with one of a convex and concave shape, and wherein the end face of the plug-pin has the other one of a convex and concave shape.

24. The connector of claim 20 wherein the housing wall has an interior recess extending circumferentially thereabout at the housing ported portion and the C-shaped spring is at least partially received in the recess.

25. A high-pressure connector for an electrical power cable segment having a central stranded conductor encased in a polymeric insulation jacket and having an interstitial void volume in the region of the stranded conductor, the high-pressure connector being suited for confining a fluid within the interstitial void volume at a residual pressure above atmospheric, but below the elastic limit of the polymeric insulation jacket, the high-pressure connector comprising:

a housing having a wall defining an interior chamber configured to be in fluid communication with the interstitial void volume, the housing having an end portion with the housing wall thereof sized to receive the insulation jacket within the interior chamber and to overlap at least a portion of the insulation jacket at an end thereof with the cable segment extending from the housing end portion and at least a portion of the stranded conductor positioned within the interior chamber, the housing wall of the housing end portion having an engagement portion configured to be sufficiently secured to the insulation jacket and in fluid-tight sealed engagement therewith to confine the fluid at the residual pressure within the housing interior chamber and the interstitial void volume and to prevent pushback of the insulation jacket at the residual pressure, wherein the engagement portion of the housing wall of the housing end portion has inwardly projecting engagement members configured to deform and partially penetrate the insulation jacket along a periphery thereof to secure the housing wall to the insulation jacket.

26. A high-pressure connector for an electrical power cable segment having a central stranded conductor encased in a polymeric insulation jacket and having an interstitial void volume in the region of the stranded conductor, the high-pressure connector being suited for confining a fluid within the interstitial void volume at a residual pressure above atmospheric, but below the elastic limit of the polymeric insulation jacket, the high-pressure connector comprising:

a housing having a wall defining an interior chamber configured to be in fluid communication with the interstitial void volume, the housing having an end portion with the housing wall thereof sized to receive the insulation jacket within the interior chamber and to overlap at least a portion of the insulation jacket at an end thereof with the cable segment extending from the housing end portion and at least a portion of the stranded conductor positioned within the interior chamber, the housing wall of the housing end portion having an engagement portion configured to be sufficiently secured to the insulation jacket and in fluid-tight sealed engagement therewith to confine the fluid at the residual pressure within the housing interior chamber and the interstitial void volume and to prevent pushback of the insulation jacket at the residual pressure, wherein the engagement portion of the housing wall of the housing end portion is comprised of a swagable material to secure the housing wall to the insulation jacket in fluid-tight sealed engagement therewith upon inward swaging of the engagement portion of the housing wall of the housing end portion to the insulation jacket.

27. A high-pressure connector for an electrical power cable segment having a central stranded conductor encased in a polymeric insulation jacket and having an interstitial void volume in the region of the stranded conductor, the high-pressure connector being suited for confining a fluid within the interstitial void volume at a residual pressure above atmospheric, but below the elastic limit of the polymeric insulation jacket, the high-pressure connector comprising:

a housing having a wall defining an interior chamber configured to be in fluid communication with the interstitial void volume, the housing having an end portion with the housing wall thereof sized to receive the insulation jacket within the interior chamber and to overlap at least a portion of the insulation jacket at an end thereof with the cable segment extending from the housing end portion and at least a portion of the stranded conductor positioned within the interior chamber, the housing wall of the housing end portion having an engagement portion configured to be sufficiently secured to the insulation jacket and in fluid-tight sealed engagement therewith to confine the fluid at the residual pressure within the housing interior chamber and the interstitial void volume and to prevent pushback of the insulation jacket at the residual pressure, wherein the engagement portion of the housing wall of the housing end portion has inwardly projecting engagement members configured to deform and partially penetrate the insulation jacket along a periphery thereof, the engagement portion being a swagable material and configured such that upon inward swaging of the engagement portion to the insulation jacket the engagement members are moved inward to deform and partially penetrate the insulation jacket along the periphery thereof to secure the housing wall to the insulation jacket in fluid-tight sealed engagement therewith.

28. The connector of claim 25 further including a conductor member configured to be secured to the housing, and to be secured to the stranded conductor and in electrical contact therewith.

29. The connector of claim 28 wherein the conductor member is configured to be positioned within the housing interior chamber.

30. The connector of claim 29 wherein the conductor member is configured to be in fluid-tight sealed engagement with the housing.

31. A high-pressure connector for connecting together first and second electrical power cable segments, the first cable segment having a first central stranded conductor encased in a first polymeric insulation jacket and having a first interstitial void volume in the region of the first stranded conductor, the high-pressure connector being suited for confining a first fluid within the first interstitial void volume at a first residual pressure above atmospheric, but below the elastic limit of the first polymeric insulation jacket, and the second cable segment having a second central stranded conductor encased in a second polymeric insulation jacket and having a second interstitial void volume in the region of the second stranded conductor, the high-pressure connector being suited for confining a second fluid within the second interstitial void volume at a second residual pressure above atmospheric, but below the elastic limit of the second polymeric insulation jacket, the high-pressure connector comprising:

a housing having a wall defining first and second interior chambers, the housing first interior chamber being configured to be in fluid communication with the first interstitial void volume, the housing having a first end portion with the housing wall thereof sized to receive the first insulation jacket of the first cable segment within the housing first interior chamber and to overlap at least a portion of the first insulation jacket at an end thereof with the first cable segment extending from the housing first end portion and at least a portion of the first stranded conductor of the first cable segment positioned within the housing first interior chamber, and the housing second interior chamber being configured to be in fluid communication with the second interstitial void volume, the housing having a second end portion with the housing wall thereof sized to receive the second insulation jacket of the second cable segment within the housing second interior chamber and to overlap at least a portion of the second insulation jacket at an end thereof with the second cable segment extending from the housing second end portion and at least a portion of the second stranded conductor of the second cable segment positioned within the housing second interior chamber;

a first seal configured to seal the first insulation jacket with respect to the housing wall at the first end portion of the housing to confine the first fluid at the first residual pressure within the housing first interior chamber and the first interstitial void volume;

a second seal configured to seal the second insulation jacket with respect to the housing wall at the second end portion of the housing to confine the second fluid at the second residual pressure within the housing second interior chamber and the second interstitial void volume;

a first securing member configured to secure the first cable segment to the housing at the first end portion of the housing, the first securing member being capable of preventing pushback of the first insulation jacket at the first residual pressure; and a second securing member configured to secure the second cable segment to the housing at the second end portion of the housing, the second securing member being capable of preventing pushback of the second insulation jacket at the second residual pressure, wherein the first securing member has inwardly projecting engagement members configured to deform and partially penetrate the first insulation jacket along a periphery thereof to secure the housing wall to the first insulation jacket, and the second securing member has inwardly projecting engagement members configured to deform and partially penetrate the second insulation jacket along a periphery thereof to secure the housing wall to the second insulation jacket.

32. The connector of claim 31 further including a conductor member configured to be secured to the first and second stranded conductors and in electrical contact therewith.

33. The connector of claim 32 wherein the conductor member is configured to be secured to the housing.

34. The connector of claim 33 wherein the conductor member is configured to be in fluid-tight sealed engagement with the housing at a position between the first and second end portions of the housing.

35. A high-pressure connector for connecting together first and second electrical power cable segments, the first cable segment having a first central stranded conductor encased in a first polymeric insulation jacket and having a first interstitial void volume in the region of the first stranded conductor, the high-pressure connector being suited for confining a first fluid within the first interstitial void volume at a first residual pressure above atmospheric, but below the elastic limit of the first polymeric insulation jacket, and the second cable segment having a second central stranded conductor encased in a second polymeric insulation jacket and having a second interstitial void volume in the region of the second stranded conductor, the high-pressure connector being suited for confining a second fluid within the second interstitial void volume at a second residual pressure above atmospheric, but below the elastic limit of the second polymeric insulation jacket, the high-pressure connector comprising:

a housing having a wall defining first and second interior chambers, the housing first interior chamber being configured to be in fluid communication with the first interstitial void volume, the housing having a first end portion with the housing wall thereof sized to receive the first insulation jacket of the first cable segment within the housing first interior chamber and to overlap at least a portion of the first insulation jacket at an end thereof with the first cable segment extending from the housing first end portion and at least a portion of the first stranded conductor of the first cable segment positioned within the housing first interior chamber, and the housing second interior chamber being configured to be in fluid communication with the second interstitial void volume, the housing having a second end portion with the housing wall thereof sized to receive the second insulation jacket of the second cable segment within the housing second interior chamber and to overlap at least a portion of the second insulation jacket at an end thereof with the second cable segment extending from the housing second end portion and at least a portion of the second stranded conductor of the second cable segment positioned within the housing second interior chamber;

a first seal configured to seal the first insulation jacket with respect to the housing wall at the first end portion of the housing to confine the first fluid at the first residual pressure within the housing first interior chamber and the first interstitial void volume;

a second seal configured to seal the second insulation jacket with respect to the housing wall at the second end portion of the housing to confine the second fluid at the second residual pressure within the housing second interior chamber and the second interstitial void volume;

a first securing member configured to secure the first cable segment to the housing at the first end portion of the housing, the first securing member being capable of preventing pushback of the first insulation jacket at the first residual pressure;

a second securing member configured to secure the second cable segment to the housing at the second end portion of the housing, the second securing member being capable of preventing pushback of the second insulation jacket at the second residual pressure; and a conductor member configured to be secured to the first and second stranded conductors and in electrical contact therewith, wherein the conductor member has a first end portion sized for positioning within the housing first interior chamber and a second end portion sized for positioning within the housing second interior chamber.

36. The connector of claim 35 wherein the first end portion of the conductor member has a first member wall defining a first interior member chamber with a first open end, the first interior member chamber being sized to receive the first stranded conductor therein and the first member wall being of a crimpable material to secure the first end portion of the conductor member to the first stranded conductor in electrical contact therewith upon inward crimping of the first member wall, and wherein the second end portion of the conductor member has a second member wall defining a second interior member chamber with a second open end, the second interior member chamber being sized to receive the second stranded conductor therein and the second member wall being of a crimpable material to secure the second end portion of the conductor member to the second stranded conductor in electrical contact therewith upon inward crimping of the second member wall.

37. The connector of claim 36 wherein the conductor member is configured to be in fluid-tight sealed engagement with the housing at a position between the first and second member walls of the conductor member.

38. A high-pressure connector for connecting together first and second electrical power cable segments, the first cable segment having a first central stranded conductor encased in a first polymeric insulation jacket and having a first interstitial void volume in the region of the first stranded conductor, the high-pressure connector being suited for confining a first fluid within the first interstitial void volume at a first residual pressure above atmospheric, but below the elastic limit of the first polymeric insulation jacket, and the second cable segment having a second central stranded conductor encased in a second polymeric insulation jacket and having a second interstitial void volume in the region of the second stranded conductor, the high-pressure connector being suited for confining a second fluid within the second interstitial void volume at a second residual pressure above atmospheric, but below the elastic limit of the second polymeric insulation jacket, the high-pressure connector comprising:

a housing having a wall defining first and second interior chambers, the housing first interior chamber being configured to be in fluid communication with the first interstitial void volume, the housing having a first end portion with the housing wall thereof sized to receive the first insulation jacket of the first cable segment within the housing first interior chamber and to overlap at least a portion of the first insulation jacket at an end thereof with the first cable segment extending from the housing first end portion and at least a portion of the first stranded conductor of the first cable segment positioned within the housing first interior chamber, and the housing second interior chamber being configured to be in fluid communication with the second interstitial void volume, the housing having a second end portion with the housing wall thereof sized to receive the second insulation jacket of the second cable segment within the housing second interior chamber and to overlap at least a portion of the second insulation jacket at an end thereof with the second cable segment extending from the housing second end portion and at least a portion of the second stranded conductor of the second cable segment positioned within the housing second interior chamber;

a first seal configured to seal the first insulation jacket with respect to the housing wall at the first end portion of the housing to confine the first fluid at the first residual pressure within the housing first interior chamber and the first interstitial void volume, wherein the first seal includes a first portion of the housing wall of the first end portion of the housing comprised of a swagable material to seal the first portion to the first insulation jacket in fluid-tight sealed engagement therewith upon inward swaging of the first portion to the first insulation jacket;

a second seal configured to seal the second insulation jacket with respect to the housing wall at the second end portion of the housing to confine the second fluid at the second residual pressure within the housing second interior chamber and the second interstitial void volume, wherein the second seal includes a second portion of the housing wall of the second end portion of the housing comprised of a swagable material to seal the second portion to the second insulation jacket in fluid-tight sealed engagement therewith upon inward swaging of the second portion to the second insulation jacket;

a first securing member configured to secure the first cable segment to the housing at the first end portion of the housing, the first securing member being capable of preventing pushback of the first insulation jacket at the first residual pressure; and a second securing member configured to secure the second cable segment to the housing at the second end portion of the housing, the second securing member being capable of preventing pushback of the second insulation jacket at the second residual pressure.

39. A high-pressure connector for connecting together first and second electrical power cable segments, the first cable segment having a first central stranded conductor encased in a first polymeric insulation jacket and having a first interstitial void volume in the region of the first stranded conductor, the high-pressure connector being suited for confining a first fluid within the first interstitial void volume at a first residual pressure above atmospheric, but below the elastic limit of the first polymeric insulation jacket, and the second cable segment having a second central stranded conductor encased in a second polymeric insulation jacket and having a second interstitial void volume in the region of the second stranded conductor, the high-pressure connector being suited for confining a second fluid within the second interstitial void volume at a second residual pressure above atmospheric, but below the elastic limit of the second polymeric insulation jacket, the high-pressure connector comprising:

a housing having a wall defining first and second interior chambers, the housing first interior chamber being configured to be in fluid communication with the first interstitial void volume, the housing having a first end portion with the housing wall thereof sized to receive the first insulation jacket of the first cable segment within the housing first interior chamber and to overlap at least a portion of the first insulation jacket at an end thereof with the first cable segment extending from the housing first end portion and at least a portion of the first stranded conductor of the first cable segment positioned within the housing first interior chamber, and the housing second interior chamber being configured to be in fluid communication with the second interstitial void volume, the housing having a second end portion with the housing wall thereof sized to receive the second insulation jacket of the second cable segment within the housing second interior chamber and to overlap at least a portion of the second insulation jacket at an end thereof with the second cable segment extending from the housing second end portion and at least a portion of the second stranded conductor of the second cable segment positioned within the housing second interior chamber, wherein a first portion of the housing wall of the first end portion of the housing is comprised of a swagable material and a second portion of the housing wall of the second end portion of the housing is comprised of a swagable material;

a first seal configured to seal the first insulation jacket with respect to the housing wall at the first end portion of the housing to confine the first fluid at the first residual pressure within the housing first interior chamber and the first interstitial void volume, the first seal comprising the first portion of the housing wall of the first end portion of the housing and being swagable to move into fluid-tight sealed engagement with the first insulation jacket;

a second seal configured to seal the second insulation jacket with respect to the housing wall at the second end portion of the housing to confine the second fluid at the second residual pressure within the housing second interior chamber and the second interstitial void volume, the second seal comprising the second portion of the housing wall of the second end portion of the housing and being swagable to move into fluid-tight sealed engagement with the second insulation jacket;

a first securing member configured to secure the first cable segment to the housing at the first end portion of the housing, the first securing member being capable of preventing pushback of the first insulation jacket at the first residual pressure, wherein the first securing member comprises inwardly projecting engagement members attached to the first portion of the first end portion of the housing and configured to deform and partially penetrate the first insulation jacket along a periphery thereof to secure the housing wall to the first insulation jacket upon the first portion of the first end portion of the housing being moved into fluid-tight sealed engagement with the first insulation jacket; and a second securing member configured to secure the second cable segment to the housing at the second end portion of the housing, the second securing member being capable of preventing pushback of the second insulation jacket at the second residual pressure, wherein the second securing member comprises inwardly projecting engagement members attached to the second portion of the second end portion of the housing and configured to deform and partially penetrate the second insulation jacket along a periphery thereof to secure the housing wall to the second insulation jacket upon the second portion of the second end portion of the housing being moved into fluid-tight sealed engagement with the second insulation jacket.

* * * * *

UNITED STATES PATENT AND TRADEMARK OFFICE
CERTIFICATE OF CORRECTION

| | | |
|---|---|---|
| PATENT NO. | : 7,195,504 B2 | Page 1 of 1 |
| APPLICATION NO. | : 11/070393 | |
| DATED | : March 27, 2007 | |
| INVENTOR(S) | : Glen John Bertini and Anthony Roy Theimer | |

It is certified that error appears in the above-identified patent and that said Letters Patent is hereby corrected as shown below:

Column 6, line 3: "machined teeth" should read --rectangular tabs--.

Column 19, line 44, "213" should read -- 214 --.

Column 19, line 62: insert -- be -- between "may" and "slid."

Column 20, line 41: "231" should read -- 211 --.

Column 20, line 43: "231" should read -- 211 --.

Signed and Sealed this

Eighteenth Day of September, 2007

JON W. DUDAS
*Director of the United States Patent and Trademark Office*